(12) United States Patent
Miyoshi et al.

(10) Patent No.: US 8,959,174 B2
(45) Date of Patent: *Feb. 17, 2015

(54) SYSTEM, APPARATUS, METHOD AND PROGRAM FOR PROCESSING INFORMATION

(75) Inventors: Toshimasa Miyoshi, Kanagawa (JP); Hideo Nagasaka, Kanagawa (JP); Takashi Tominaga, Tokyo (JP); Tadaaki Kimijima, Tokyo (JP); Shigeru Inoue, Tokyo (JP); Soichiro Atsumi, Shizuoka (JP); Mamoru Tokashiki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/349,918

(22) Filed: Jan. 13, 2012

(65) Prior Publication Data

US 2012/0117191 A1 May 10, 2012

Related U.S. Application Data

(62) Division of application No. 12/077,645, filed on Mar. 20, 2008, now Pat. No. 8,112,474.

(30) Foreign Application Priority Data

Mar. 23, 2007 (JP) ................. 2007-077353

(51) Int. Cl.
*G06F 15/16* (2006.01)
*H04L 29/06* (2006.01)
(Continued)

(52) U.S. Cl.
CPC ............... *H04L 65/60* (2013.01); *G06F 21/10* (2013.01); *H04L 67/06* (2013.01); *H04L 67/2842* (2013.01); *H04L 67/28* (2013.01)

USPC .............. 709/217; 709/218; 709/219; 705/59

(58) Field of Classification Search
CPC ......... G06F 21/10; G06F 15/16; H04L 65/60; H04L 67/2842
USPC .................... 709/217–219; 705/59
See application file for complete search history.

(56) References Cited

U.S. PATENT DOCUMENTS 6,243,087 B1 6/2001 Davis et al.
6,477,532 B1 11/2002 Duliege
(Continued)

FOREIGN PATENT DOCUMENTS

FR 2 795 843 A 1/2001
JP 2000-040149 A 2/2000
(Continued)

OTHER PUBLICATIONS

Uda, Ryuya et al., "Software-based Music Delivery Platform", Information Processing Society of Japan, Aug. 15, 2000; p. 2237-2245, vol. 41 No. 8, The Information Processing Society of Japan.
(Continued)

*Primary Examiner* — Razu Miah
(74) *Attorney, Agent, or Firm* — Wolf, Greenfield & Sacks, P.C.

(57) ABSTRACT

In response to a request, one of primary content data as a copyrighted work and incidental content data is received from a server. With a music editing and sharing application, the content data is used in a secondary usage fashion for editing in order to produce new incidental content data. The incidental content data is not the one that is produced by arranging directly the primary content data as an editing material but play control information for giving an instruction defining a play mode. The incidental content data is uploaded to an incidental content server.

6 Claims, 23 Drawing Sheets

(51) Int. Cl.
*G06F 21/10* (2013.01)
*H04L 29/08* (2006.01)

(56) References Cited

U.S. PATENT DOCUMENTS

| | | | |
|---|---|---|---|
| 6,567,847 B1 * | 5/2003 | Inoue | 709/219 |
| 6,665,659 B1 | 12/2003 | Logan | |
| 7,626,112 B2 * | 12/2009 | Miyajima | 84/609 |
| 7,716,572 B2 | 5/2010 | Beauregard et al. | |
| 7,793,214 B2 | 9/2010 | Koinuma | |
| 7,870,315 B2 * | 1/2011 | Moon | 710/62 |
| 8,112,474 B2 | 2/2012 | Miyoshi et al. | |
| 8,176,118 B2 | 5/2012 | Nagasaka et al. | |
| 8,249,427 B2 | 8/2012 | Nagasaka et al. | |
| 8,266,061 B2 * | 9/2012 | Ito et al. | 705/59 |
| 8,386,925 B2 | 2/2013 | Nagasaka et al. | |
| 8,396,938 B2 * | 3/2013 | Oscherov et al. | 709/217 |
| 8,438,197 B2 | 5/2013 | Miyoshi et al. | |
| 2001/0040945 A1 | 11/2001 | Fujino et al. | |
| 2002/0040435 A1 | 4/2002 | Hamada et al. | |
| 2002/0083324 A1 * | 6/2002 | Hirai | 713/176 |
| 2002/0107595 A1 * | 8/2002 | Abe et al. | 700/94 |
| 2002/0124182 A1 * | 9/2002 | Bacso et al. | 713/200 |
| 2002/0177434 A1 * | 11/2002 | Suzuki et al. | 455/412 |
| 2003/0028892 A1 * | 2/2003 | Gewickey et al. | 725/110 |
| 2004/0068505 A1 | 4/2004 | Lee et al. | |
| 2004/0139318 A1 | 7/2004 | Fiala et al. | |
| 2004/0221018 A1 * | 11/2004 | Ji | 709/217 |
| 2005/0021774 A1 * | 1/2005 | Kurihara et al. | 709/228 |
| 2005/0125528 A1 * | 6/2005 | Burke et al. | 709/223 |
| 2005/0193335 A1 * | 9/2005 | Dorai et al. | 715/530 |
| 2005/0195975 A1 * | 9/2005 | Kawakita | 380/30 |
| 2005/0235209 A1 | 10/2005 | Morita et al. | |
| 2006/0004669 A1 | 1/2006 | Ito | |
| 2006/0036568 A1 | 2/2006 | Moore et al. | |
| 2006/0080262 A1 * | 4/2006 | Ito et al. | 705/59 |
| 2006/0107822 A1 * | 5/2006 | Bowen | 84/612 |
| 2006/0190576 A1 * | 8/2006 | Lee et al. | 709/223 |
| 2006/0206580 A1 * | 9/2006 | Johnson, III | 709/217 |
| 2006/0294571 A1 * | 12/2006 | Moore et al. | 725/135 |
| 2007/0061892 A1 * | 3/2007 | Kurihara | 726/27 |
| 2007/0074617 A1 * | 4/2007 | Vergo | 84/612 |
| 2007/0136438 A1 * | 6/2007 | Brocke et al. | 709/217 |
| 2007/0297755 A1 | 12/2007 | Holt et al. | |
| 2008/0016114 A1 * | 1/2008 | Beauregard et al. | 707/104.1 |
| 2008/0086689 A1 * | 4/2008 | Berkley et al. | 715/731 |
| 2008/0109483 A1 | 5/2008 | Yoo et al. | |
| 2008/0127812 A1 * | 6/2008 | Sako et al. | 84/625 |
| 2008/0235268 A1 | 9/2008 | Miyoshi et al. | |
| 2008/0235356 A1 * | 9/2008 | Miyoshi et al. | 709/219 |
| 2008/0259745 A1 | 10/2008 | Sako et al. | |
| 2008/0310267 A1 | 12/2008 | Hattori et al. | |
| 2009/0106261 A1 | 4/2009 | Nagasaka et al. | |
| 2009/0119273 A1 | 5/2009 | Nagasaka et al. | |
| 2009/0210481 A1 * | 8/2009 | Fletcher et al. | 709/203 |
| 2009/0297128 A1 | 12/2009 | Nagasaka et al. | |
| 2009/0299823 A1 | 12/2009 | Nagasaka et al. | |
| 2009/0299981 A1 | 12/2009 | Nagasaka et al. | |
| 2009/0300036 A1 | 12/2009 | Nagasaki | |
| 2010/0036814 A1 | 2/2010 | Kalasapur et al. | |
| 2010/0064882 A1 | 3/2010 | Miyajima et al. | |
| 2010/0080528 A1 | 4/2010 | Yen et al. | |
| 2012/0185566 A1 | 7/2012 | Nagasaka et al. | |
| 2013/0132387 A1 | 5/2013 | Nagasaka et al. | |

FOREIGN PATENT DOCUMENTS

| | | |
|---|---|---|
| JP | 2000-048076 A | 2/2000 |
| JP | 2000-113066 A | 4/2000 |
| JP | 2001-325387 A | 11/2001 |
| JP | 2002-056015 A | 2/2002 |
| JP | 2002-109103 A | 4/2002 |
| JP | 2002-207736 A | 7/2002 |
| JP | 2002-351878 A | 12/2002 |
| JP | 2003-115837 A | 4/2003 |
| JP | 2003-256736 A | 9/2003 |
| JP | 2003-265736 A | 9/2003 |
| JP | 2004-023247 A | 1/2004 |
| JP | 2004-139175 A | 5/2004 |
| JP | 2004-139184 A | 5/2004 |
| JP | 2004-252575 A | 9/2004 |
| JP | 2004-264898 A | 9/2004 |
| JP | 2004-310464 A | 11/2004 |
| JP | 2005-195673 A | 7/2005 |
| JP | 2006-018753 A | 1/2006 |
| JP | 2006-146426 A | 6/2006 |
| JP | 2006-190200 A | 7/2006 |
| JP | 2006-331189 A | 12/2006 |
| JP | 2007-013911 A | 1/2007 |
| JP | 2008-165837 A | 7/2008 |
| WO | WO 03/067486 A1 | 8/2003 |

OTHER PUBLICATIONS

Tatsuro Mori et al., "Second contents generation type multi-media archive system", Institute of Image Electronics Engineers of Japan Magazine, Institute of Image Electronics Engineers of Japan, Sep. 25, 2002, vol. 31, No. 5, p. 879-891.

* cited by examiner

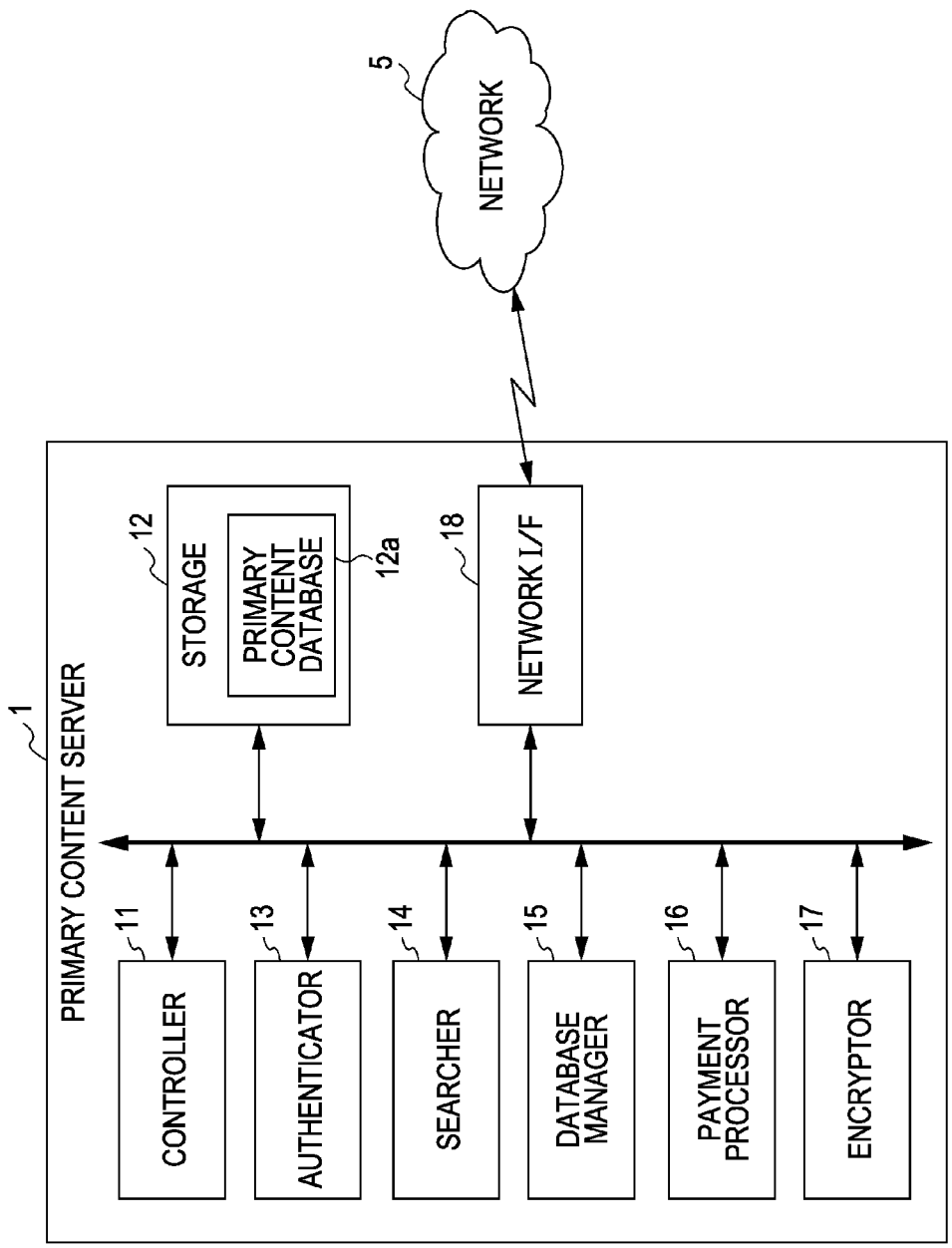

FIG. 13

USAGE PRIMARY CONTENT INFORMATION/
USAGE EDITING MATERIAL CONTENT INFORMATION

UNIT FILE INFORMATION:

| FILE ID | | AAAAAA |
|---|---|---|
| ARTIST NAME | | - - - - |
| SONG NAME | | - - - - |
| USAGE PERMISSION RANGE INFORMATION | USAGE ITEM 1 | PERMITTED |
| | USAGE ITEM 2 | UNPERMITTED |
| | ⋮ | ⋮ |
| | USAGE ITEM 3 | PERMITTED |

UNIT FILE INFORMATION:

| FILE ID | | BBBBBB |
|---|---|---|
| ARTIST NAME | | - - - - |
| SONG NAME | | - - - - |
| USAGE PERMISSION RANGE INFORMATION | USAGE ITEM 1 | PERMITTED |
| | USAGE ITEM 2 | ONE GENERATION ONLY PERMITTED |
| | ⋮ | ⋮ |
| | USAGE ITEM 3 | UNPERMITTED |

UNIT FILE INFORMATION:

| FILE ID | | CCCCCC |
|---|---|---|
| ARTIST NAME | | - - - - |
| SONG NAME | | - - - - |
| USAGE PERMISSION RANGE INFORMATION | USAGE ITEM 1 | UNPERMITTED |
| | USAGE ITEM 2 | PERMITTED |
| | ⋮ | ⋮ |
| | USAGE ITEM 3 | PERMITTED |

FIG. 14

PLAY CONTROL INFORMATION

[
file_id = AAAAAA
time = 00:00 − 00:10
position = vv − zz
]
[
file_id = AAAAAA
time = 00:10 − 00:15
position = ss − tt
]
[
file_id = BBBBBB
time = 00:15 − 00:20
position = pp − uu
]
.
.
.
.

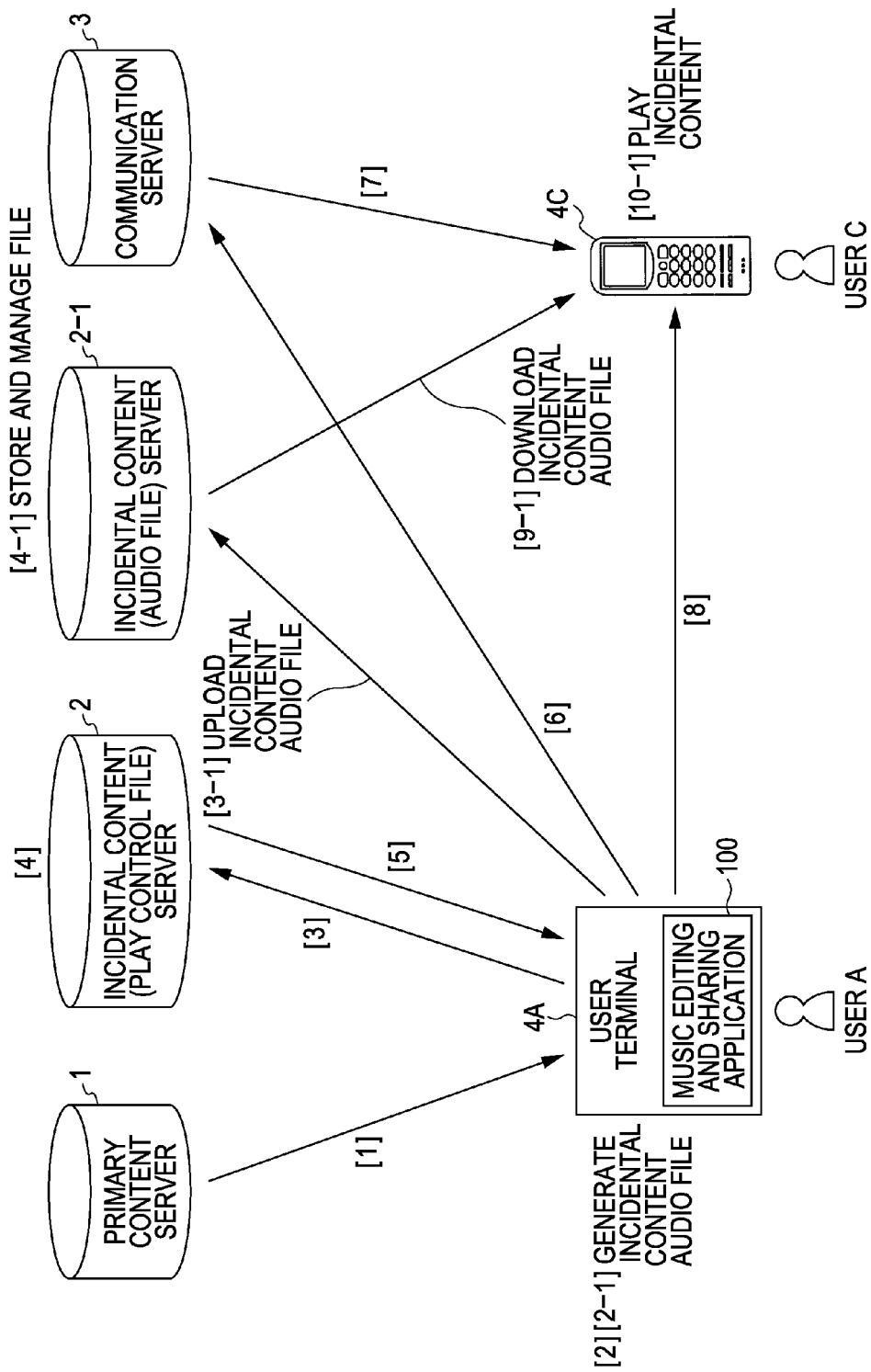

SYSTEM, APPARATUS, METHOD AND PROGRAM FOR PROCESSING INFORMATION

CROSS REFERENCES TO RELATED APPLICATIONS

This application is a divisional of and claims the benefit under 35 U.S.C. §120 of U.S. patent application Ser. No. 12/077,645, titled "SYSTEM, APPARATUS, AND PROGRAM FOR DISTRIBUTING INCIDENTAL CONTENT," filed on Mar. 20, 2008, which claims the benefit under 35 U.S.C. §119 of Japanese Patent Application JP 2007-077353, filed in the Japanese Patent Office on Mar. 23, 2007. The contents of both applications are hereby incorporated by reference in their entireties.

BACKGROUND OF THE INVENTION

1. Field of the Invention

The present invention relates to an information processing system for allowing music to be delivered via a network and a file to be shared via the network, an information processing apparatus contained in the information processing system and a computer program executed by the information processing apparatus.

2. Description of the Related Art

Content delivery is widely performed using a network. An audio content delivery system is one example of content delivery. Audio content to be delivered is music composed by an artist, for example, and stored and managed in a server as digital audio data. A user owning an information processing terminal such as a personal computer installs application software (client software) having a client function for content delivery on the information processing terminal. After a proper transaction for purchasing, the user runs the client software and downloads the audio data as desired audio content. The data downloaded as the audio content is typically stored and managed on a storage device in the information processing terminal by the user. The user can thus enjoy the music using the client software to play the audio data as the audio content stored on the information processing terminal.

Also known as application software (editing software) is the one that retrieves audio data and video data as a material and arranges and edits the material to produce a new song. Recently, such application software having a simple to a complex structure is in widespread use among not only specialists for music production but also an ordinary person who do not work on music on a regular basis.

The editing software modifies read data as content (such as audio and video data) for editing. For example, sampling and mashup are performed on audio data so that part of existing music is easily acquired and edited. In practice, professional musicians have released a lot of music produced using such a technique. Reference is made to Japanese Unexamined Patent Application Publication Nos. 2004-310464 and 2006-18753.

SUMMARY OF THE INVENTION

Under these circumstances, some users may wish to use delivered content and not only enjoy merely data of the content but also create new content by performing a secondary editing process using the editing software and release the created content to the public.

Such a user who does not work on music on a regular basis has difficult finding a site and releasing created content the site. In view of a substantial amount of time and money expected, many such users would hesitate to go on a project. This difficulty becomes an obstacle to such people intending to enjoy producing music.

In accordance with one embodiment of the present invention, an information processing system includes a primary content server, an incidental content server and a terminal, each communicating with the other via a network. The primary content server includes a primary content information storage unit for storing primary content information containing at least main information of a primary content. The incidental content server includes an incidental content information storage unit for storing incidental content information, the incidental content information containing, as main information, play control information containing an instruction to play the main information of the prior content as an original editing material, a primary content information download control unit for causing the primary content server to transit to the terminal, via the network, primary content information requested by the terminal out of the primary content information stored on the primary content information storage unit, and an incidental content information download control unit for causing the incidental content server to transmit to the terminal, via the network, incidental content information requested by the terminal out of the incidental content information stored on the incidental content information storage unit. The terminal includes a content information storage unit for storing locally on the terminal the primary content information transmitted from the primary content information download control unit and the incidental content information transmitted from the incidental content information download control unit, an edit processing unit for performing an edit process by using in a secondary usage fashion at least one of the primary content information and the incidental content information, locally stored on the content information storage unit, an incidental content information generating unit for generating incidental content information containing a new content based on editing results of the edit processing unit, and a content information upload control unit for causing the terminal to transmit to the incidental content server via the network the incidental content information generated by the incidental content information generating unit to be stored on the incidental content information storage unit.

In accordance with one embodiment of the present invention, an information processing apparatus includes an communication unit for communicating via a network, a primary content information download control unit for causing a primary content server to transmit, via the network, specified primary content information of primary content information stored on the primary content server and containing at least main information of a primary content in order to retrieve the primary content information, an incidental content information download control unit for causing an incidental content server to transmit, via the network, specified incidental content information of the incidental content information stored on the incidental content server and containing, as main information, play control information containing an instruction to play the main information of the primary content as an original editing material in order to retrieve the incidental content information, an edit processing unit for performing an edit process using in a secondary usage fashion at least one of the primary content information retrieved by the primary content information download control unit and the incidental content information retrieved by the incidental content information download control unit, an incidental content information generating unit for generating incidental content information containing a new content based on editing results of the edit processing unit and a content information upload control unit for causing a terminal to transmit to the incidental content server via the network the incidental content information generated by the incidental content information generating unit to be stored on an incidental content information storage unit.

Each of the information processing system and the information processing apparatus (terminal) downloads the primary content information and the incidental content information and stores the downloaded information locally thereon for later retrieval. The information processing apparatus then performs the edit process on the primary content information and incidental content information in order to produce new incidental content information and uploads the new incidental content information to the incidental content server for storage. The produced incidental content is thus disclosed on the incidental content server. The main information as the incidental content information is the play control information containing the instruction to play the main information of the primary content as the original editing material. The substantial body of the incidental content information is the play control information rather than being the data body of the primary content as the original editing material.

In accordance with one embodiment of the present invention, an information processing apparatus, includes a communication unit for communicating via a network, an incidental content information storage unit for storing primary content information and incidental content information, the primary content information including at least main information of a primary content and the incidental content information generated by edit processing in a secondary use at least one unit of incidental content information containing, as main information, play control information containing an instruction to play the main information of the primary content as an original editing material, a storage location setting unit for setting a storage location of the received incidental content information in the incidental content information storage unit when the received incidental content information is stored on the incidental content information storage unit in response to reception of the incidental content information uploaded over the network, and a notification unit for notifying another information processing apparatus having uploaded the incidental content information of the storage location set by the storage location setting unit.

With this arrangement, the information processing apparatus (terminal) as the incidental content server transmits the storage location information indicating the storage location of the incidental content information to the information processing apparatus having transmitted the incidental content information, in response to reception of the incidental content information uploaded. The accessing to the incidental content uploaded to the incidental content server, namely, disclosure of the incidental content is performed with reference to the storage location information notified to the terminal as a transmission source.

In accordance with one embodiment of the present invention, an information processing apparatus, includes a communication unit for communicating via a network, an incidental content information storage unit for storing primary content information and incidental content information, the primary content information including at least main information of a primary content and the incidental content information generated by edit processing in a secondary usage at least one unit of incidental content information containing, as main information, play control information containing an instruction to play the main information of the primary content as an original editing material, a terminal identifying unit for identifying a network terminal of a copyright manager of the primary content as an original editing material of the received incidental content information in response to reception of the incidental content information uploaded via the network, and a new upload notification unit for notifying via the network the network terminal identified by the terminal identifying unit that incidental content information of the primary content of the copyright manager of the network terminal used as an original editing material is newly stored.

Upon receiving and storing the incidental content information uploaded, the information processing apparatus as the incidental content server identifies the network terminal of the copyright manager of the primary content as the original editing material of the incidental content information stored. The information processing apparatus notifies the network terminal that the incidental content information has been stored.

Without searching, the copyright manger can reliably learn the presence of the incidental content information related to the primary content which is used as an original editing material and the copyright of which is managed by the copyright manager.

In accordance with the system of embodiments of the present invention, the data of delivered content is used in a secondary usage fashion to produce incidental content and the produced incidental content is uploaded over the network for disclosure. General users can smoothly produce and disclose content using the system of embodiments of the present invention. The substantial data body of the incidental content information is the play control information containing the instruction relating to the mode of playing of the primary content. In this way, the incidental content allows a variety of applications of the primary content, in addition to simply viewing the primary content. The level of entertainment is thus increased.

The incidental content server notifies the terminal receiving the incidental content information in the upload operation of the storage location information of the incidental content. The user of the terminal may notify users of other terminals of the storage location information via any other means, thereby positively informing acquaintances of the incidental content produced by the user. The user as a creator of the incidental content may use a network as a communication medium for disclosing the incidental content to acquaintances. The network system of embodiments of the present invention is enhanced in usefulness and the degree of entertainment.

BRIEF DESCRIPTION OF THE DRAWINGS

FIG. 6 illustrates an internal structure of a primary content server in accordance with one embodiment of the present invention;

FIG. 13 diagrammatically illustrates a structure of usage primary content information and usage editing material content information in the incidental content play control file in accordance with one embodiment of the present invention;

FIG. 14 illustrates play control information in the incidental content play control file in accordance with one embodiment of the present invention;

FIG. 24 illustrates a system configuration and system operation of a system in which the incidental content as audio data is managed and shared.

DESCRIPTION OF THE PREFERRED EMBODIMENTS

Figure 1:
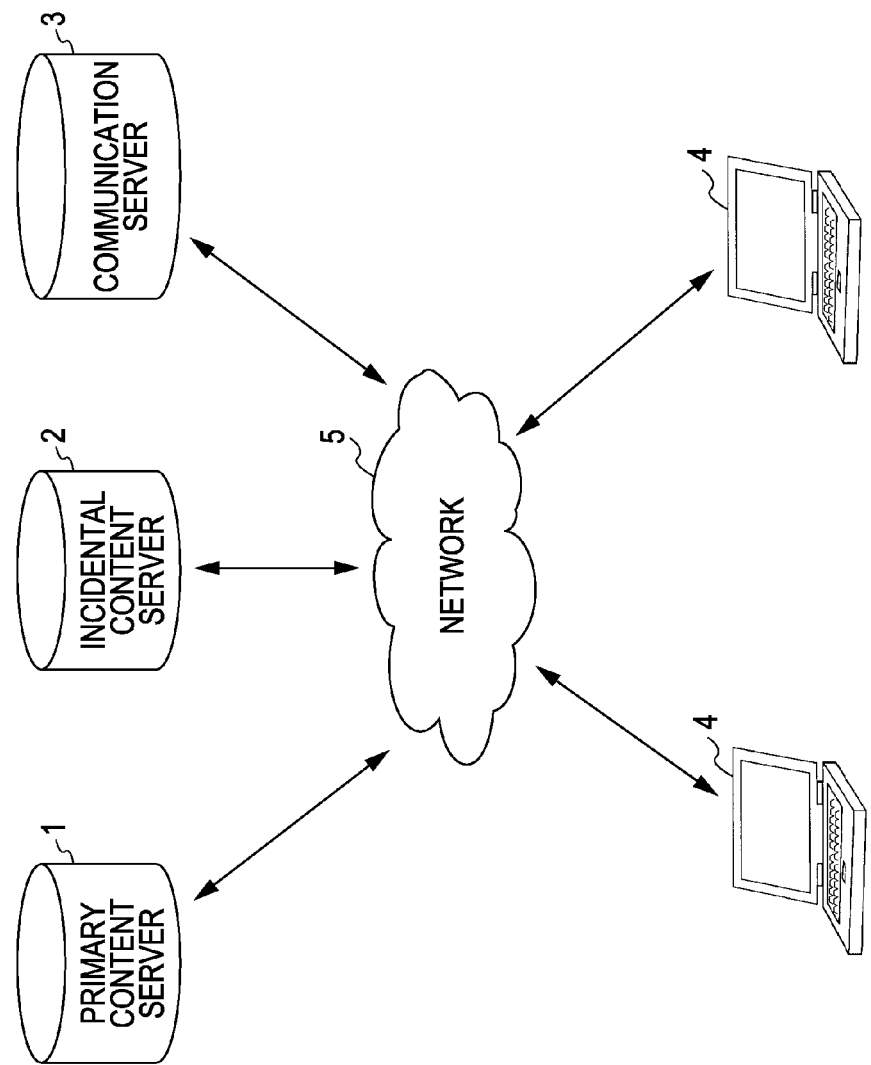
FIG. 1 illustrates a system configuration of a music editing and sharing system in accordance with one embodiment of the present invention.

FIG. 1 illustrates an information processing system in accordance with one embodiment of the present invention.

As shown in FIG. 1, the information processing system includes a primary content server 1, an incidental content server 2, a communication server 3, and a large number of user terminals 4, each linked to the other via a network 5.

The information processing system of one embodiment of the present invention forms a music delivery and sharing system. More specifically, music (primary content) and content (incidental content) produced by users are shared among users.

The primary content server 1 stores a great deal of audio content data in a predetermined format as primary content and manages the audio content data in the form of a database. In response to a download request from the user terminal 4, the primary content server 1 outputs audio data as specified primary content to the user terminal 4.

The audio data as the primary content may be a song played an artist and supplied by an affiliate label company, for example.

The incidental content server 2 stores data of a large number of incidental content play control files as the incidental content and manages the data in the form of a database.

The incidental content play control file may be uploaded from the user terminal 4 to the incidental content server 2 via a network. The incidental content server 2 stores the incidental content play control files thus uploaded as the incidental content. In response to a download request from the user terminal 4 via the network, the incidental content server 2 transmits the requested incidental content play control file to the user terminal 4.

The communication server 3 also provides information service operated by individual users and user-to-user communication service, also referred to as consumer generated media (CGM) including social networking service (SN) or blog.

The user terminal 4 is a network device used by an individual user. In practice, the user terminal 4 is a personal computer having a network communication function with local area network (LAN).

An application program as a music editing and sharing application 100 is installed on the user terminal 4. By operating the music editing and sharing application 100, the user can download primary content from the primary content server 1, and generate new incidental content by performing an editing process on the downloaded primary content (and the incidental content). The user also can upload to the incidental content server 2 generated incidental content (i.e., an incidental content play control file), download an incidental content (incidental content play control file) from the incidental content server 2, use an SNS service using the communication server 3, and write and browse a blog.

Figure 2:
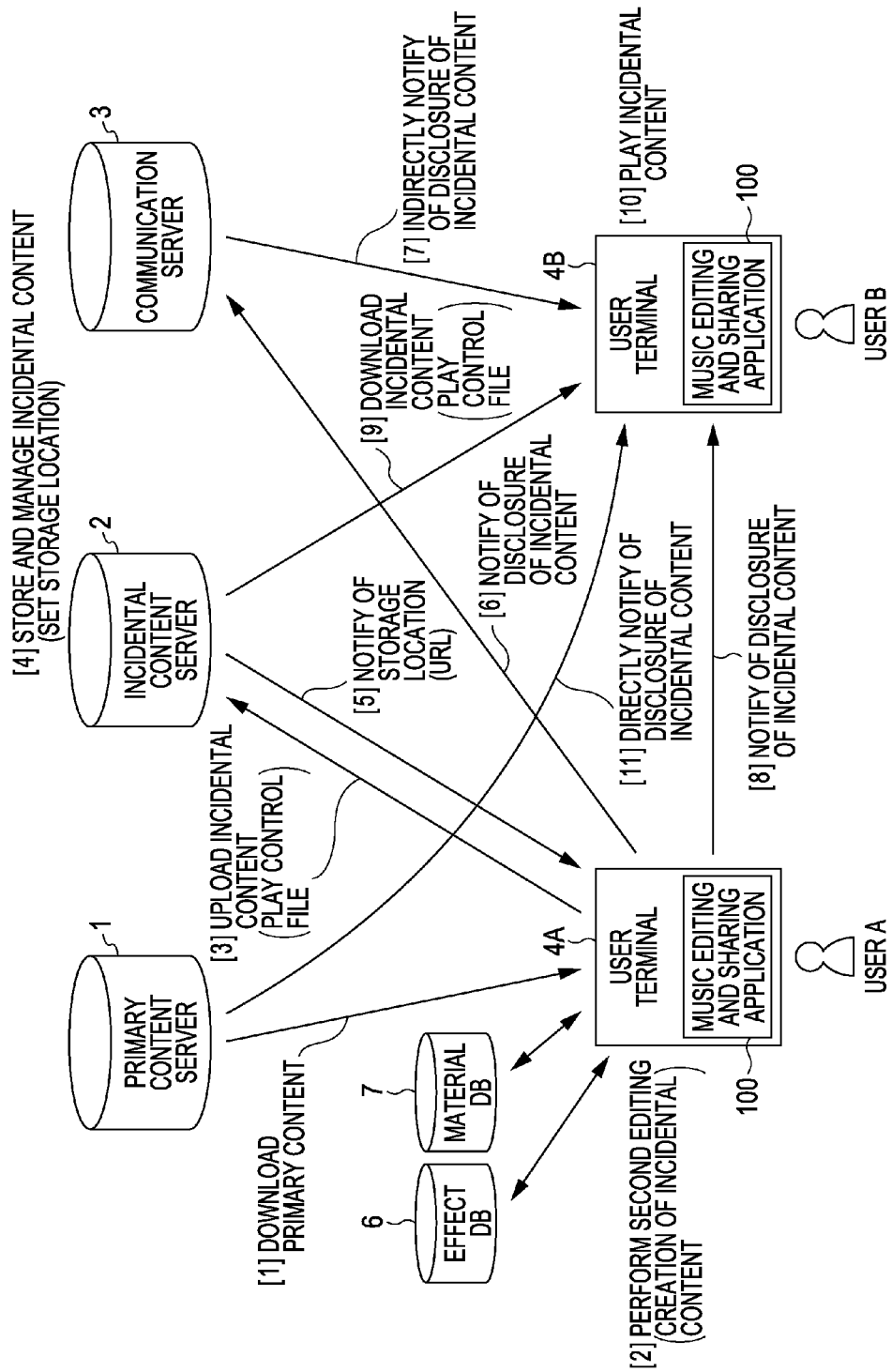
FIG. 2 illustrates a basic usage of and system operation of the music editing and sharing system in accordance with one embodiment of the present invention.

Basic operation of the information processing system of one embodiment of the present invention of FIG. 1 is described below with reference to FIG. 2 in accordance with a basic usage mode of the user of the user terminal 4. With reference to FIG. 2, the information processing system is described in the order of procedure numbers (enclosed in brackets [ ]) in FIG. 2. User terminals 4A and 4B respectively operated by users A and B are illustrated in FIG. 2. FIG. 2 does not illustrate the network 5 actually present between the primary content server 1, the incidental content server 2, the communication server 3 and the user terminal 4.

Procedure 1

The user A searches on the user terminal 4A (music editing and sharing application 100) for primary content the user desires to download. The user A performs an operation to download the hit primary content. In response to the operation, the user terminal 4A transmits a download request to the primary content server 1.

Downloading of each primary content is a fee-based service in principle in the music editing and sharing system of one embodiment of the present invention. When a download request is transmitted to the primary content server 1, the user A needs to perform a predetermined purchase transaction. The purchase transaction may be based on a per song fee basis or on a per album fee basis. The purchase transaction may be performed on a subscription basis. The subscription purchase is more and more widely accepted recently. Alternatively, the incidental content may be supplied free of charge. In such a case, the user A does not need to perform any purchase transaction.

Upon receiving the download request, the primary content server 1 authenticates the requesting user and verifies fee payment status in order to determine whether the download request is valid. If it is determined that the download request is valid, the primary content server 1 searches for incidental content requested in the download request out of the incidental content stored thereon and transmits data of the hit primary content (primary content data) to the user terminal 4 as a requesting terminal. The substantial body of the primary contents stored and managed by the primary content server 1 has a file structure containing, as main information, audio data in a predetermined format containing song as a primary content (data for playing the primary content) and a variety of metadata related to the primary content (such as a song title, an artist, a title of an album, genre, a data format, and a data size). In the discussion that follows, the main body of the primary content data is digital audio data, from which the corresponding song results when played.

The primary content data output from the primary content server 1 is received by the user terminal 4A. The user terminal 4A (music editing and sharing application 100) stores the received primary content data on a recording medium such as an internal hard disk drive (HDD). The music editing and sharing application 100 manages the thus stored primary content data in a predetermined structure based on metadata while playing the primary content in response to a user operation input.

The primary content data stored on the primary content server 1 is purchased by the user in principle, and then downloaded to the user terminal 4. In the procedure 1, music is delivered.

The primary content data stored on the user terminal 4A is played by the music editing and sharing application 100 and the user can listen to the song from an audio device connected to the user terminal 4A.

Procedure 2

In music delivery over the network, use of downloaded music is limited to playing with part of digital audio data copy protected. In other words, a user having downloaded audio content is permitted to use the audio content only within a certain range. For example, the user is not authorized to produce a song by arranging the downloaded audio content as a secondary creation.

In accordance with one embodiment of the present invention, the primary content is audio content. The user is permitted to use the primary content (in a secondary use and edit) for a secondary creation within a predetermined range. The secondary use of the primary content in one embodiment of the present invention is set within a range authorized by an original creator of a song as primary content.

The music editing and sharing application 100 of one embodiment of the present invention uses the primary content managed thereby (stored thereon) in a secondary usage fashion and performs an editing process in response to the user operation input. The music editing and sharing application 100 thus produces audio content as a new song. When such audio content is edited, plug-in data having a predetermined special effect available in an effect database (DB) 6 is retrieved and used. Similarly, an audio material available in a material database 7 may be retrieved and added in the editing process. The effect database 6 and material database 7 may be arranged on the network or locally on the user terminal 4A.

The audio content thus produced is now referred to as incidental content different from the primary content. In the procedure 2, the user produces a single piece of incidental content by operating the user terminal 4A with the music editing and sharing application 100 running.

The substantial body of the incidental content produced in the procedure 2 is not digital audio data having music such as the primary content but play control information. The play control information contains an instruction to play what portion of the digital audio data as the audio content used in a secondary usage fashion (editing material content) at which timing and an instruction for special effects.

Figure 3:
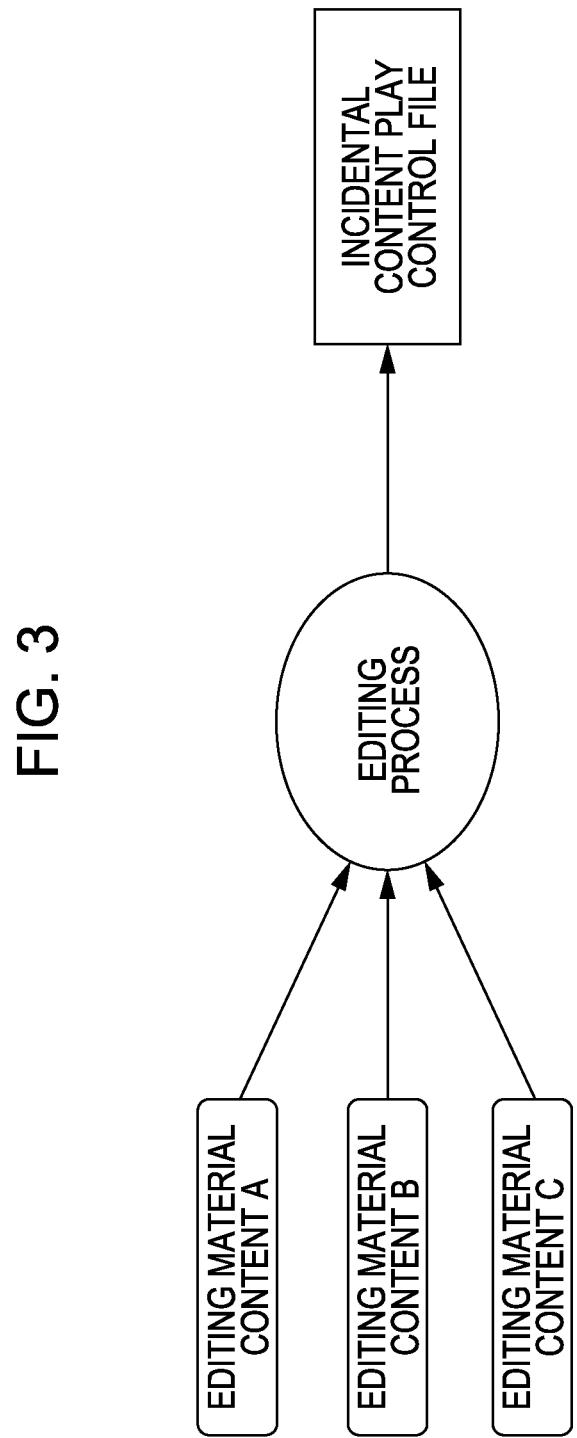
FIG. 3 diagrammatically illustrates incidental content generated by a user terminal in accordance with one embodiment of the present invention.

FIG. 3 diagrammatically illustrates a secondary editing process performed by the music editing and sharing application 100. Editing material contents A, B and C to be used in a secondary usage fashion are edited in response to user operation input. Incidental content play control information composed of the play control information rather than the audio data is thus output.

The incidental content data (incidental content play control information) as the play control information is substantially smaller in data size than the audio data. A memory capacity of a recording medium such as a hard disk storing the incidental content data is saved and effectively used in the incidental content server 2. When the incidental content data is exchanged over the network, the transmitted data remains small in data size and resulting traffic remains light.

Existing songs are edited to produce a secondary work as a new song in the second editing process of one embodiment of the present invention. Such a secondary creation is frequently performed by professional musicians in sampling or mashup. Under these circumstances, it is only natural that an ordinary user may wish to produce a song as a secondary creation. In practice, an ordinary user has difficulty producing a song as a secondary creation even if the problem of copyright is cleared.

The music delivery and sharing system of one embodiment of the present invention allows an ordinary user to perform a secondary editing process in a legally acceptable method using the delivered song. The music delivery and sharing system can thus provide a high degree of entertainment in the delivered content.

The primary content is defined as audio content the user has purchased and permitted to use in a secondary usage fashion within a range authorized by the copyright holder. The music delivery service of the primary content server 1 of one embodiment of the present invention delivers the audio content the copyright holder positively permits to be used. In accordance with one embodiment of the present invention, the editing process for the secondary use of the primary content is limited to the user operation on the music editing and sharing application 100 developed for the music delivery and sharing system. For example, the editing process cannot be performed using another editing software unrelated to the music delivery and sharing system of the embodiment of the present invention. A mechanism for such a limitation will be described later.

Procedure 3

The incidental content play control file produced as the incidental content by the user A in accordance with the procedure 2 is stored on only the user terminal 4A of the user A. As will be described later with reference to FIG. 4, the sound of the song is played as the incidental content in accordance with the play function of the music editing and sharing application 100.

In accordance with one embodiment of the present invention, the incidental content produced by the user is disclosed over the network. Users who receive the service of the music editing and sharing application 100 can share the incidental content.

The user A may wish to share the incidental content produced in accordance with the procedure 2. The user A then performs a predetermined operation on the music editing and sharing application 100, thereby uploading the incidental content produced in accordance with the procedure 2 to the incidental content server 2. That procedure is a procedure 3.

As previously discussed, the body of the incidental content is an incidental content play control file. In the upload process of the incidental content in the procedure 3, the user terminal 4A (music editing and sharing application 100) outputs the incidental content play control file together with an upload request.

Procedure 4

In response to the upload request as described above, the incidental content server 2 stores on a database as a new registration the incidental content play control file as the incidental content received together the request. The incidental content server 2 sets a storage location (for example, uniform resource locator (URL)), stores the incidental content play control file to register the incidental content play control file on the database thereof.

The incidental content server 2 has a disclosure function of disclosing the incidental content registered on the database. More specifically, the incidental content server 2 discloses the incidental content by presenting a list of incidental content units registered on the database in response to an access from the user terminal 4 (music editing and sharing application 100). The incidental content server 2 can transmit the disclosed incidental content in response to a download request from the user terminal 4 (music editing and sharing application 100) as will be described later.

Procedure 5

Upon storing and managing the incidental content play control file, the incidental content server 2 transmits an address (a storage location address) indicating a storage location of the uploaded incidental content (incidental content play control file) to the user terminal 4A. The user terminal 4A has issued the upload request.

The music editing and sharing application 100 of the user terminal 4A receives the storage location address, and stores and manages the storage location address on a predetermined recording medium. The user A can now output the storage location address of the incidental content uploaded in the procedure 2 by performing a predetermined operation on the music editing and sharing application 100.

Procedure 6

The user A having retrieved the storage location address described above can notify another user using one of several means that the incidental content of the user A has been disclosed by the incidental content server 2.

Procedure 6 is one of the disclosure notification means. As shown in FIG. 2, the user A accesses the communication server 3 in order to write on his own page in SNS or his own blog a message indicating that the incidental content produced by the user A himself is disclosed. The storage location address acquired as a URL in the procedure 5 is labeled together with the message.

Procedure 7

After the user A has written the message in the procedure 6, the user B may operate the music editing and sharing application 100 installed on the user terminal 4B and access the page of the user A in SNS or the blog of the user A for viewing. This means that the incidental content of the user A is newly disclosed. More specifically, the user B is indirectly notified of the new disclosure of the incidental content of the user A via the SNS or the blog. Procedure 7 indicates that the notification of the disclosure of the incidental content has been performed.

Procedure 8

Procedure 8 is one of the disclosure notification means. In the procedure 8, the user A produces and transmits an e-mail using a mail function of the SNS, thereby notifying the user B that the incidental content produced by the user A himself has been disclosed. The procedure 8 is more direct notification than the notification performed in the procedures 6 and 7.

In the notification of using the e-mail, the storage location address of the incidental content may be labeled on the text of the e-mail.

Procedure 9

The user B receives directly or indirectly the notification that the incidental content produced by the user A has been newly disclosed and can learn the newly disclosed incidental content. The user B may wish to listen to the newly disclosed incidental content of the user A. The user B then downloads the incidental content using the music editing and sharing application 100 in procedure 9.

To download the incidental content, the user B clicks the storage location address displayed as a link to the diary page of the SNS or the text of the blog. It is noted that if an address such as a URL is written on the diary page of the SNS or the blog, the corresponding character train is disclosed as a link.

In response to the clicking operation to the storage location address, the music editing and sharing application 100 accesses the storage location address. More specifically, the music editing and sharing application 100 accesses an address indicating the storage location of the file of the incidental content produced by the user A and disclosed (incidental content play control file) from among the addresses on the incidental content server 2. The user terminal 4B receives the incidental content play control file and the received incidental content play control file is managed under the control of the music editing and sharing application 100. The incidental content is downloaded in this way.

Procedure 10

The incidental content produced by the user A is stored and managed as described above. The music editing and sharing application 100 in the user terminal 4B can now play the incidental content. In procedure 10, the song as the incidental content is played in response to a play command operation applied to the music editing and sharing application 100.

Figure 4:
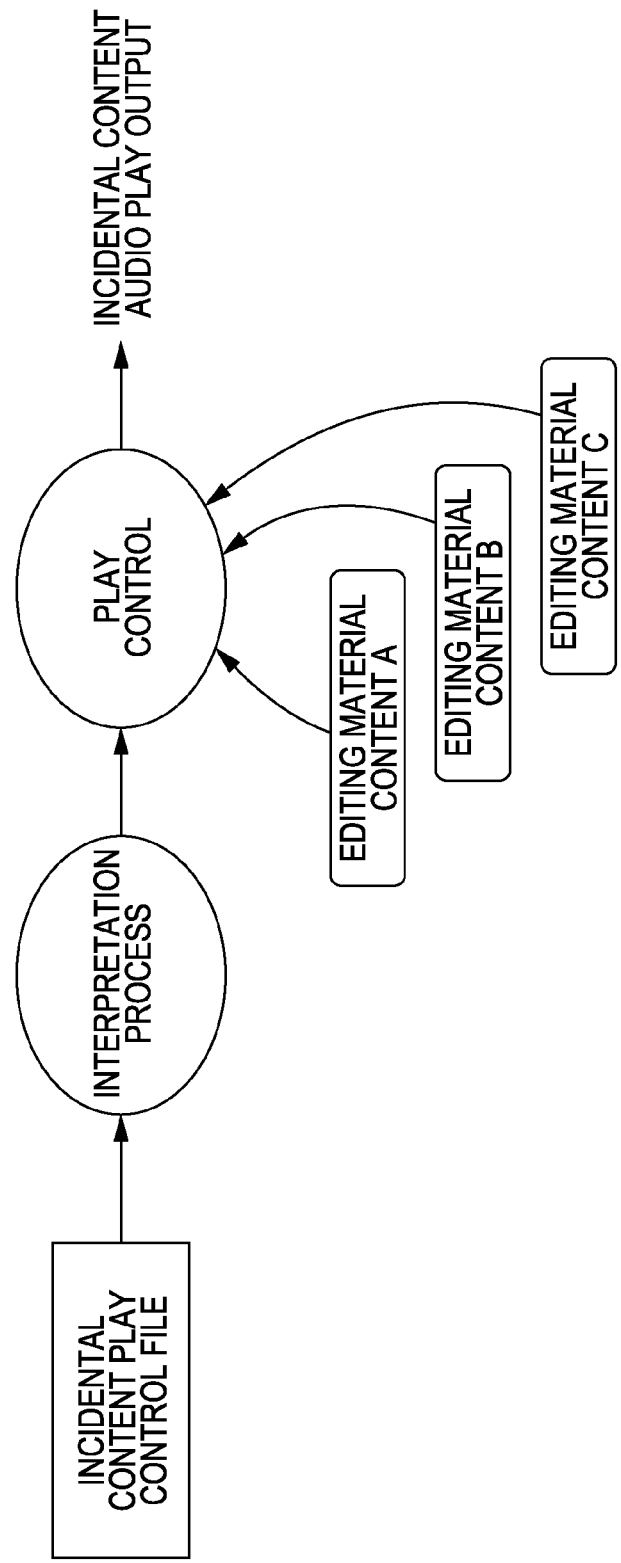
FIG. 4 diagrammatically illustrates incidental content played by the user terminal in accordance with one embodiment of the present invention.

FIG. 4 illustrates a play concept of the incidental content played by the music editing and sharing application 100.

To play the incidental content, the music editing and sharing application 100 interprets the incidental content play control file as a data body. The interpretation results may clarify what audio content is used as an editing material content, what portion of each editing material content is used, how long play time is, and how the editing material content is used, etc. As FIG. 3, FIG. 4 also illustrates audio content of the editing material content A, B and C used. In accordance with the interpretation results, the music editing and sharing application 100 performs play control using real audio data as the editing material content A, B and C. As a result, the song as the incidental content is output in sound.

With reference to FIG. 4, real audio data used as auxiliary audio content (editing material content) in the incidental content is necessary. More specifically, to play the incidental content, the real audio data of the editing material content needs to be present locally together with the music editing and sharing application 100 at least temporarily. If an attempt is made to play the incidental content with no editing material content present locally, the editing material content needs to be retrieved and present locally.

Procedure 11

In the above case, the editing material content, still unpresent locally, is downloaded in procedure 11. The procedure 11 of FIG. 2 is performed in the process of the content playing in the procedure 10.

From the aforementioned discussion, the editing material content is real audio data. The editing material content is thus primary content. In the procedure 11, the user terminal 4B accesses the primary content server 1 in order to download the primary content that is necessary to play the incidental content in the procedure 10 and still unpresent locally. After the download of the primary content, the editing material content needed to play the incidental content is locally present. The play operation is thus normally performed as shown in FIG. 4.

Several cases of the audio data of the primary content locally present as a result of the download in the procedure 11 are considered.

In one case as in a normal download process in the procedure 1, the primary content can be locally present in a storage state on an auxiliary recording device such as a hard disk drive (HDD). In another case, the primary content is temporarily stored on a main memory device such as a RAM and is then deleted when the music editing and sharing application 100 becomes disabled to play the incidental content. For example, the primary content is supplied in a fee-based service in principle as previously discussed. In the second case, the primary content may be supplied free of charge or for a fee set to be lower than in a standard download service.

Figure 5A:
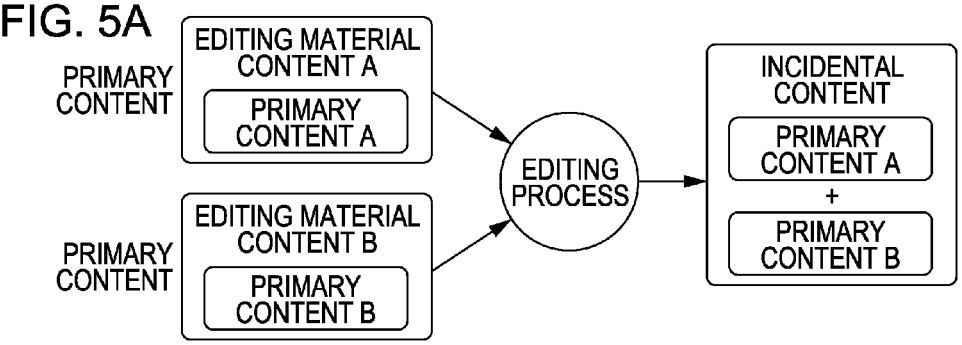
FIGS. 5A-5C illustrate usage modes of editing material content in the generation of the incidental content.
Figure 5B:
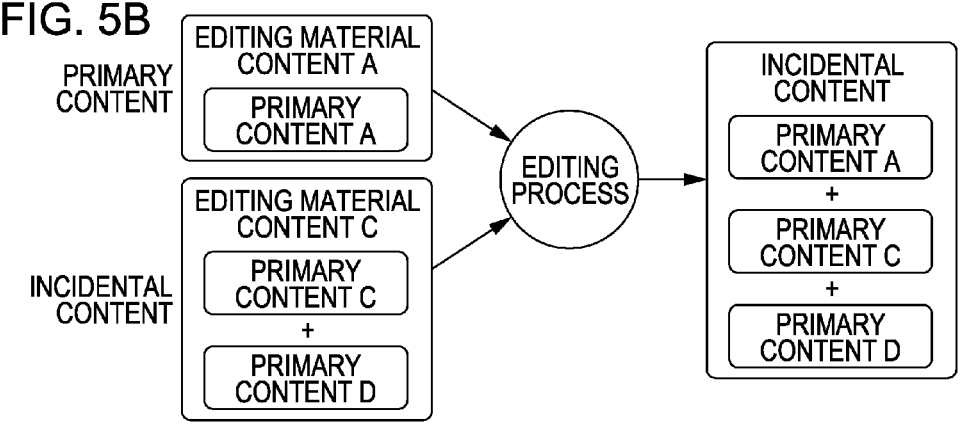
Figure 5C:
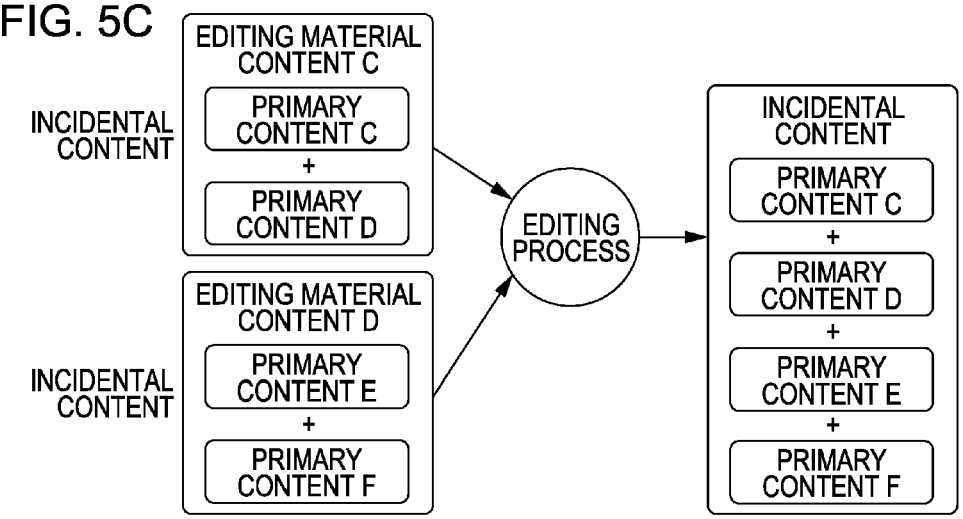

With reference to FIG. 2, the incidental content of the present embodiment is produced using the primary content as editing material content. Alternatively, the editing material content may include not only the primary content but also the incidental content. This is further discussed with reference to FIGS. 5A-5C. FIGS. 5A-5C illustrate a case in which a single piece of incidental content is produced using two pieces of editing material content in a secondary usage fashion.

FIG. 5A illustrates a case in which each of editing material content A and editing material content B is primary content as in the production case of the incidental content discussed with reference to FIG. 2. More specifically, the editing process is performed to produce the incidental content with primary content A being the editing material content A and the primary content B, different from the primary content A, being the editing material content B. As shown in FIGS. 5A-5C, the incidental content contains at least part of each of the primary content A and the primary content B. In other words, the primary content A and B is used as a basic editing material (original editing material).

FIG. 5B illustrates an incidental content that is produced by editing the same editing material content A as the primary content of FIG. 5A and editing material content C that has been produced by using primary contents C and D in a secondary usage fashion. The incidental content in this case contains part of the primary content A contained in the editing material content A and part of each of the primary contents C and D contained in the editing material content C. More specifically, the original editing content is primary contents A, C and D. To play new incidental content illustrated in FIG. 5B, it is necessary to place locally the primary content A, C and D.

FIG. 5C illustrates that the editing of two pieces of editing material content C and D as incidental content results in new incidental content. The newly produced incidental content contains part of each piece of primary content C and D contained in the editing material content C and part of each piece of primary content E and F contained in the editing material content D. To play the new incidental content of FIG. 5C, the primary content C, D, E and F as the original editing materials needs to be locally stored.

When the incidental content is used as the editing material content to produce incidental content as shown in FIGS. 5B and 5C, the user stores locally the incidental content as the editing material content in the same manner as when the primary content is handled as an editing material content. To this end, the user downloads the incidental content and stores the downloaded incidental content on the user terminal 4.

When the incidental content server 2 transmits the incidental content data in response to the download request of the incidental content, the incidental content data is encrypted. The encrypted data can be decrypted by the music editing and sharing application 100. The music editing and sharing application 100 plays only the incidental content data that is obtained using the encryption process. For example, the music editing and sharing application 100 is designed not to play incidental content data originally not encrypted at all and incidental content data encrypted with a different method or algorithm. In other words, the music editing and sharing application 100 plays only the incidental content downloaded from the incidental content server 2.

Users may exchange incidental content files in P2P (peer to peer) network communication, e-mail, or file transport protocol (FTP) or exchange incidental content files using a removable medium. A file obtained in such a way cannot be played because the file has not been encrypted by the incidental content server 2. In accordance with the present embodiment, incidental content produced by someone else can be properly played only when the incidental content is downloaded from the incidental content server 2. The music delivery and sharing system of the present embodiment prevents any illegal incidental content violating the copyright laws from being circulated and proliferated over the network. The rights of the copyright holders of the primary content and the incidental content are thus protected.

With reference to FIGS. 2 through 4 and FIGS. 5A, 5B and 5C, the music delivery and sharing system of the present embodiment allows the primary content to be downloaded (purchased) first. In other words, the user can enjoy listening to the user's own favorite songs through standard music delivery. Use right is set on primary content to permit secondary use and the user edits the primary content as an editing material to produce the user's own content. The incidental content thus produced is publicly disclosed using communication techniques such as SNS and blog. An ordinary user edits a copyrighted song, produces new audio content (incidental content), and publicly discloses the incidental content in an appropriate manner. Such a process was difficult to perform legally due to the copyright laws.

In accordance with the present embodiment, the body of the incidental content is the play control information containing at least a description of an instruction to play the primary content as an original editing material.

The music editing and sharing application 100 has not only the play function of the incidental content but also the edit function of producing the incidental content. The music editing and sharing application 100 thus performs not only the process of playing sound of the incidental content but also accounts for the edit content of the incidental content to be played, in a user interface of the edit function. Since the incidental content contains the play control information, the user can learn in detail how the downloaded incidental content has been edited, using the edit function of the music editing and sharing application 100.

A structure of the music delivery and sharing system discussed above is described below.

FIG. 6 illustrates an internal structure of the primary content server 1. The primary content server 1 includes a controller 11, a storage 12, an authenticator 13, a searcher 14, a database manager 15, a payment processor 16, an encryptor 17 and a network interface 18.

The controller 11 generally controls each element of the primary content server 1.

The storage 12, including a hard disk drive (HDD), stores a primary content database 12a. The primary content database 12a manages audio data files as the primary content in the form of database. The audio data file as the primary content contains, in a predetermined format, audio data as real data and a variety of metadata attached thereto.

In response to a download request, the authenticator 13 uses one of a user ID and a password contained in the request, thereby performing an authentication process to determine whether the user is authentic. Only if authentication results show that the user is authentic, the primary content is transmitted in response to the request.

In cooperation with the database manager 15, the searcher 14 accesses the primary content database 12a, thereby searching for the target primary content.

The database manager 15 manages the primary content database 12a. When new primary content is supplied, the database manager 15 updates the primary content database 12a to register the new primary content. When primary content is to be deleted, the database manager 15 deletes the primary content and updates the primary content database 12a accordingly.

The payment processor 16 performs a user payment process related to fee-based primary content.

The encryptor 17 performs a predetermined encryption process to the primary content to be transmitted from the primary content server 1 to the user terminal 4.

The network interface 18 performs a communication process via the network 5. For example, the network interface 18 under the control of the controller 11 receives the download request and transmits the primary content in response to the request.

Figure 7:
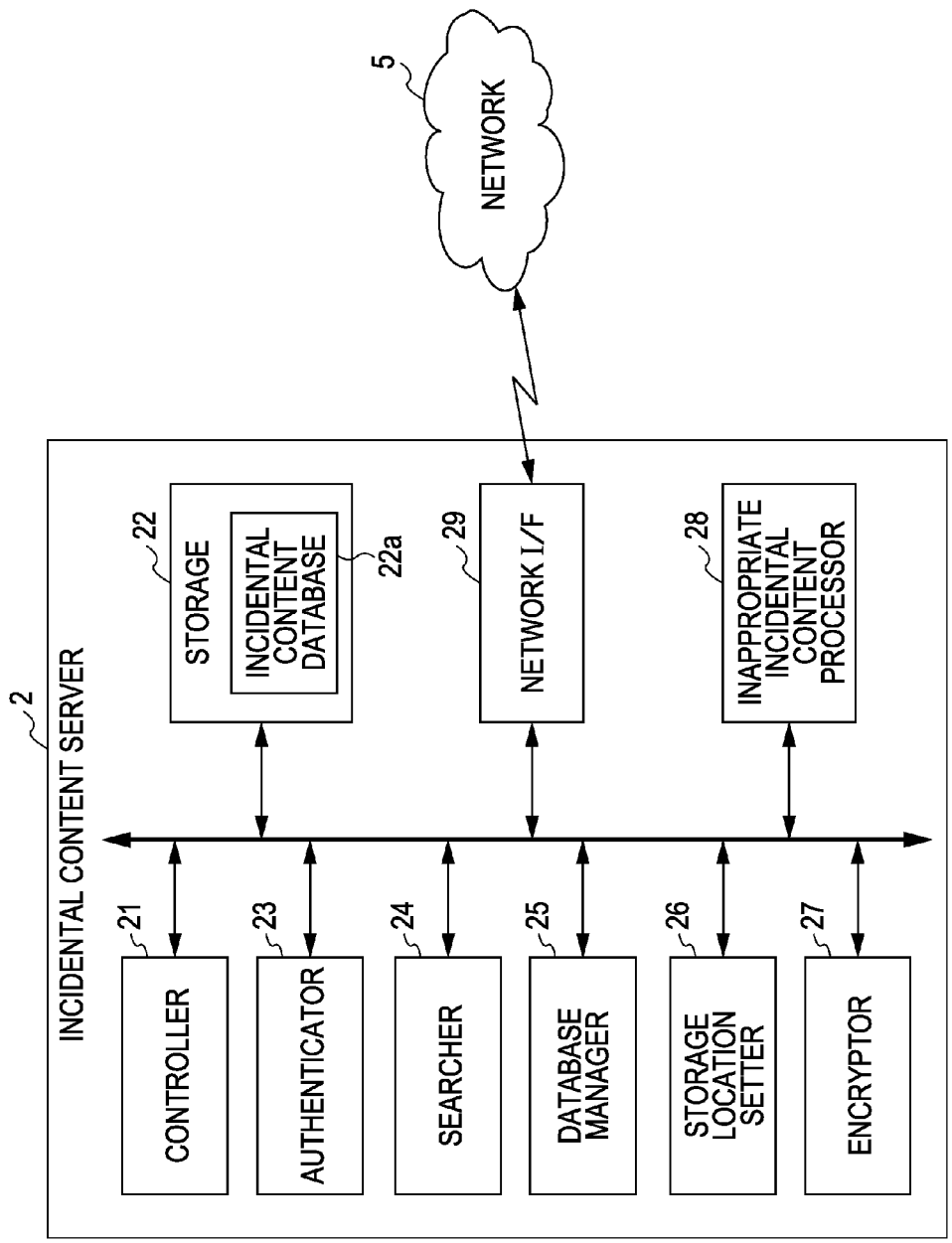
FIG. 7 illustrates an internal structure of a incidental content server in accordance with one embodiment of the present invention.

FIG. 7 illustrates an internal structure of the incidental content server 2. As shown in FIG. 7, the incidental content server 2 includes a controller 21, a storage 22, an authenticator 23, a searcher 24, a database manager 25, a storage location setter 26, an encryptor 27, an inappropriate incidental content processor 28 and a network interface 29.

The controller 21 generally controls each element in the incidental content server 2.

The storage 22, including an HDD, stores an incidental content database 22a. The incidental content database 22a is real data as incidental contents to be disclosed and includes incidental content play control files in the form of database.

In response to a download request of the incidental content, the authenticator 23 uses one of a user ID and a password contained in the request, thereby performing a predetermined authentication process to determine whether the user is authentic.

In cooperation with the database manager 25, the searcher 24 accesses the incidental content database 22a and searches for desired incidental content.

The database manager 25 manages the incidental content database 22a. For example, when incidental content (incidental content play control file) is newly uploaded, the database manager 25 updates the incidental content database 22a by registering the uploaded incidental content in the incidental content database 22a. When incidental content (incidental content play control file) is deleted, the database manager 25 performs a deletion process and then updates the incidental content database 22a accordingly.

The encryptor 27 performs a predetermined encryption process on incidental content data to be transmitted from the incidental content server 2 to the user terminal 4. When the incidental content is uploaded, the user terminal 4 may have encrypted the incidental content data before transmission, depending on system operation. In such a case, the searcher 24 decrypts the incidental content data.

The inappropriate incidental content processor 28 performs a predetermined process on inappropriate incidental content. The predetermined process of the inappropriate incidental content processor 28 will be described in detail later.

The network interface 29 communicates via the network 5. The network interface 29 under the control of the controller 21 receives the uploaded incidental content and the download request, and transmits the incidental content data (incidental content play control file) responsive to the download request.

Figure 8:
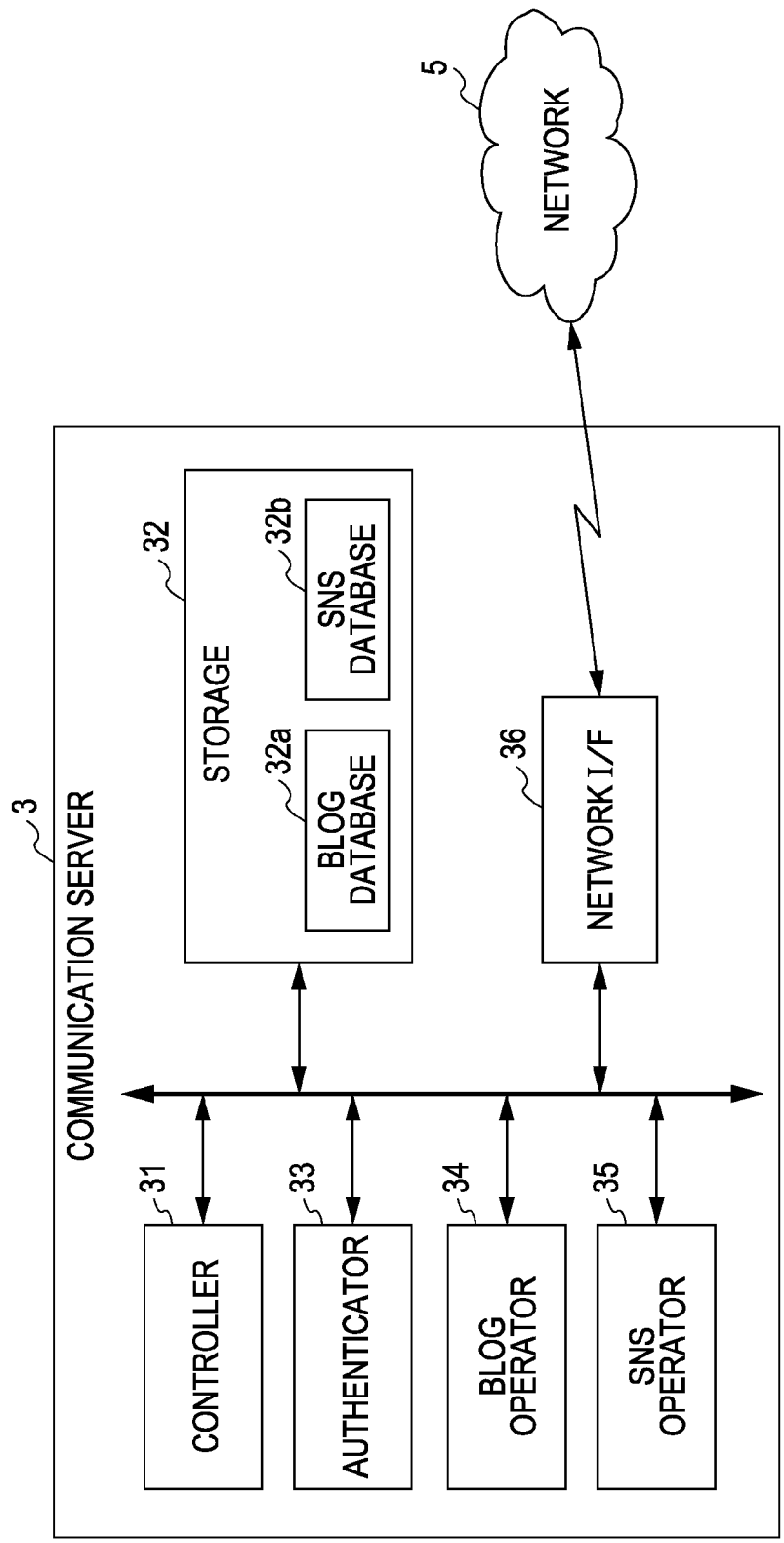
FIG. 8 illustrates an internal structure of a communication server in accordance with one embodiment of the present invention.

FIG. 8 illustrates an internal structure of the communication server 3. As shown in FIG. 8, the communication server 3 includes a controller 31, a storage 32, an authenticator 33, a blog operator 34, an SNS operator 35 and a network interface 36. The communication server 3 provides blog and SNS communication services.

The controller 31 generally controls each element in the communication server 3.

The storage 32, including an HDD, stores a blog database 32a and an SNS database 32b. The blog database 32a manages the data of blog, opened by the user, in the form of database. The SNS database 32b manages page content on a per SNS user basis in the form of database.

In response to a login request for blog updating and a login request for the SNS, the authenticator 33 uses a user ID or a password contained in the request, thereby performing an authentication process. If authentication results show that the user has been successfully authenticated, the login is allowed.

The blog operator 34 performs a variety of processes to allow blog to be operative. For example, in response to a blog access request and an authorized blog writing screen request, the blog operator 34 transmits data of blog screen and a blog writing screen. The blog operator 34 also manages the blog database 32a. For example, the blog operator 34 updates the blog database 32a, accounting for writing on the blog.

Similarly, the SNS operator 35 performs a variety of processes to allow SNS to be operative. For example, the SNS operator 35 transmits data of a page of SNS in response to the SNS page request and updates the SNS database 32b to account for writing on a diary.

The network interface 36 communicates via the network 5. The network interface 36 transmits page data in response to an access request to the blog or SNS.

The communication server 3 supports blog and SNS. Alternatively, different servers may be arranged respectively for blog and SNS. For example, GCM related service may be provided so that an individual user may issue information on a homepage operated by the individual user other than SNS and blog. Sites operated by individual users, such as homepages, are well known before SNS and blog become popular.

Figure 9:
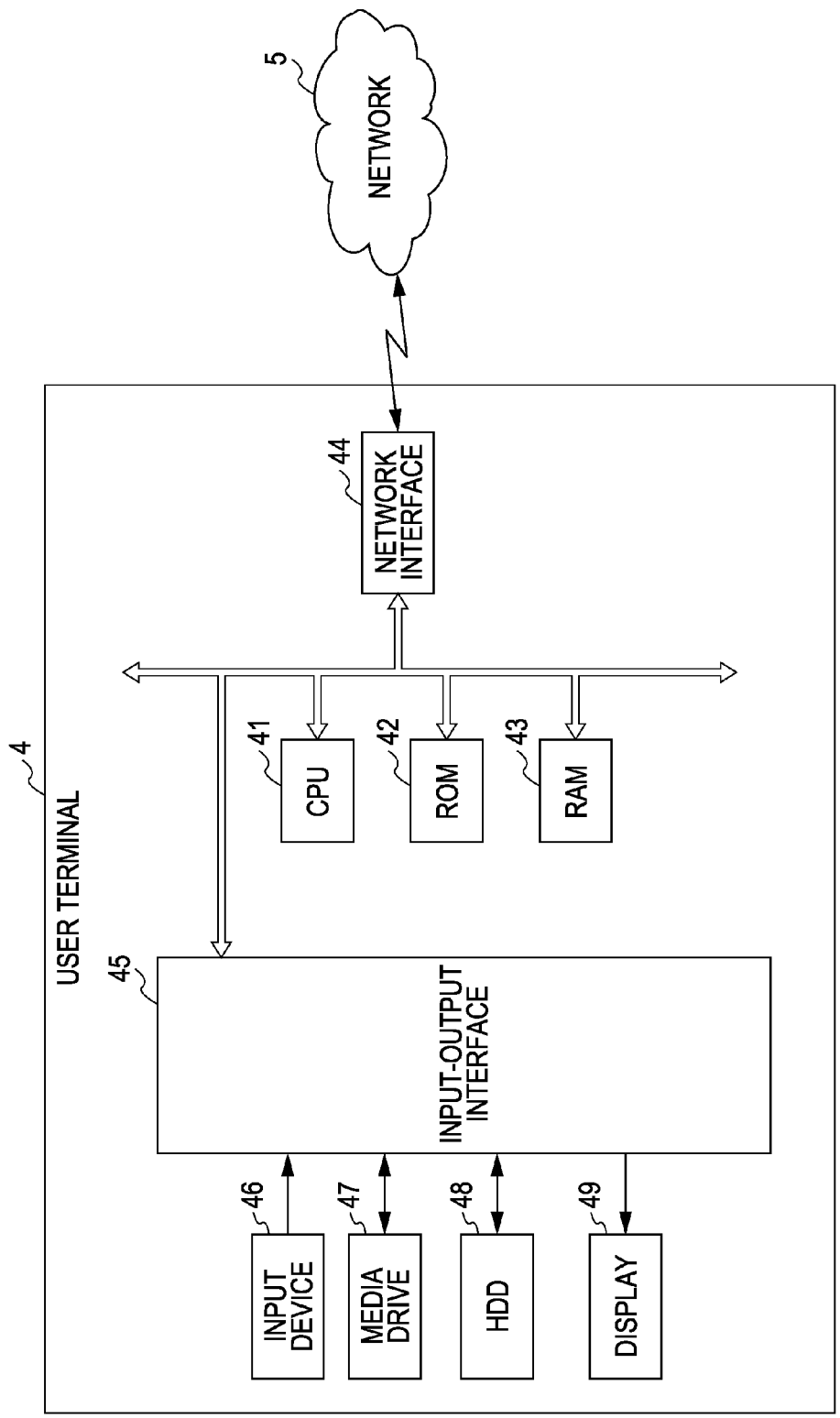
FIG. 9 illustrates an internal structure of a user terminal in accordance with one embodiment of the present invention.

FIG. 9 illustrates an internal structure of the user terminal 4. The hardware of the user terminal 4 is a personal computer.

The user terminal 4 includes a network interface 44 to communicate via the network 5. With the network interface 44, the user terminal 4 can communicate via the network 5 with each of the primary content server 1, the incidental content server 2, the communication server 3 and the user terminal 4 of another user.

A central processing unit (CPU) 41 executes a variety of processes in accordance with an operating system (OS) and a variety of programs installed on an HHD 48 and a program stored on a read-only memory (ROM) 42. In accordance with one embodiment of the present invention, an application program as the music editing and sharing application 100 is installed.

A random-access memory (RAM) 43, serving as a working area for the CPU 41, stores, as necessary, data and program required for the CPU 41 to perform the variety of programs.

An input-output interface 45 connects to an input device 46 including a keyboard and a mouse. The input-output interface 45 converts an operational signal output from the input device 46 into a signal to be supported by the CPU 41 and outputs the resulting signal to the CPU 41.

The input-output interface 45 also connects to a media drive 47. The media drive 47 records and plays data on a removable medium in a predetermined format.

The input device 46 connects to the HDD 48 including a hard disk as a recording medium. The CPU 41 reads and writes data and programs on the hard disk in the HDD 48 via the input-output interface 45.

The input-output interface 45 connects to a display 49 for displaying images thereon.

Figure 10:
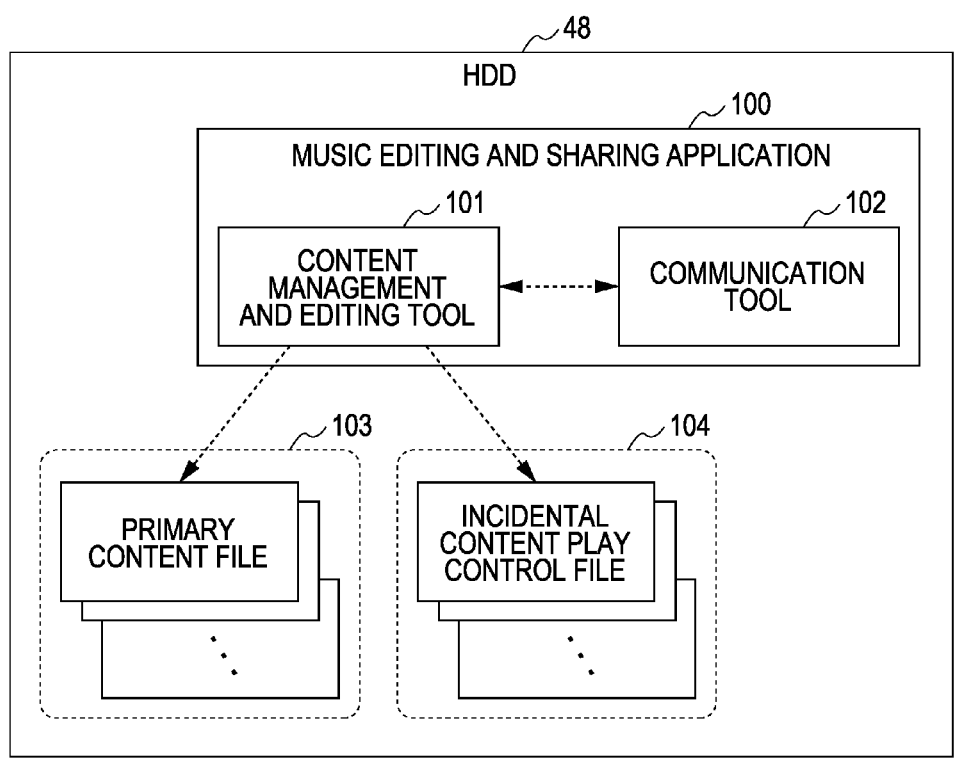
FIG. 10 illustrates information to be stored on a hard disk drive in the user terminal in accordance with one embodiment of the present invention.

FIG. 10 illustrates a structure of data stored on the HDD 48 in the music delivery and sharing system of one embodiment of the present invention.

As shown in FIG. 10, the HDD 48 stores the music editing and sharing application 100 as the data of application programs related to the music delivery and sharing system of the embodiment of the present invention. The music editing and sharing application 100 is stored onto the HDD 48 in an installation process. Under the control of the music editing and sharing application 100, the HDD 48 stores, as application files, at least one primary content file (primary content file group 103) and at least one incidental content play control file (incidental content play control file group 104).

The music editing and sharing application 100, if viewed in terms of function, is composed of a program part as the content management and editing tool 101 and a program part as the communication tool 102. The content management and editing tool 101 downloads the primary content file (composed of audio data and metadata) and the incidental content play control file and performs a file operation on the primary content file of the primary content file group 103 and the incidental content play control file of the incidental content play control file group 104. The content management and editing tool 101 also performs an editing process responsive to an editing operation input and a production process on the incidental content play control file responsive to editing results. The communication tool 102 accesses the communication server 3, thereby operating the blog and SNS.

Figure 11:
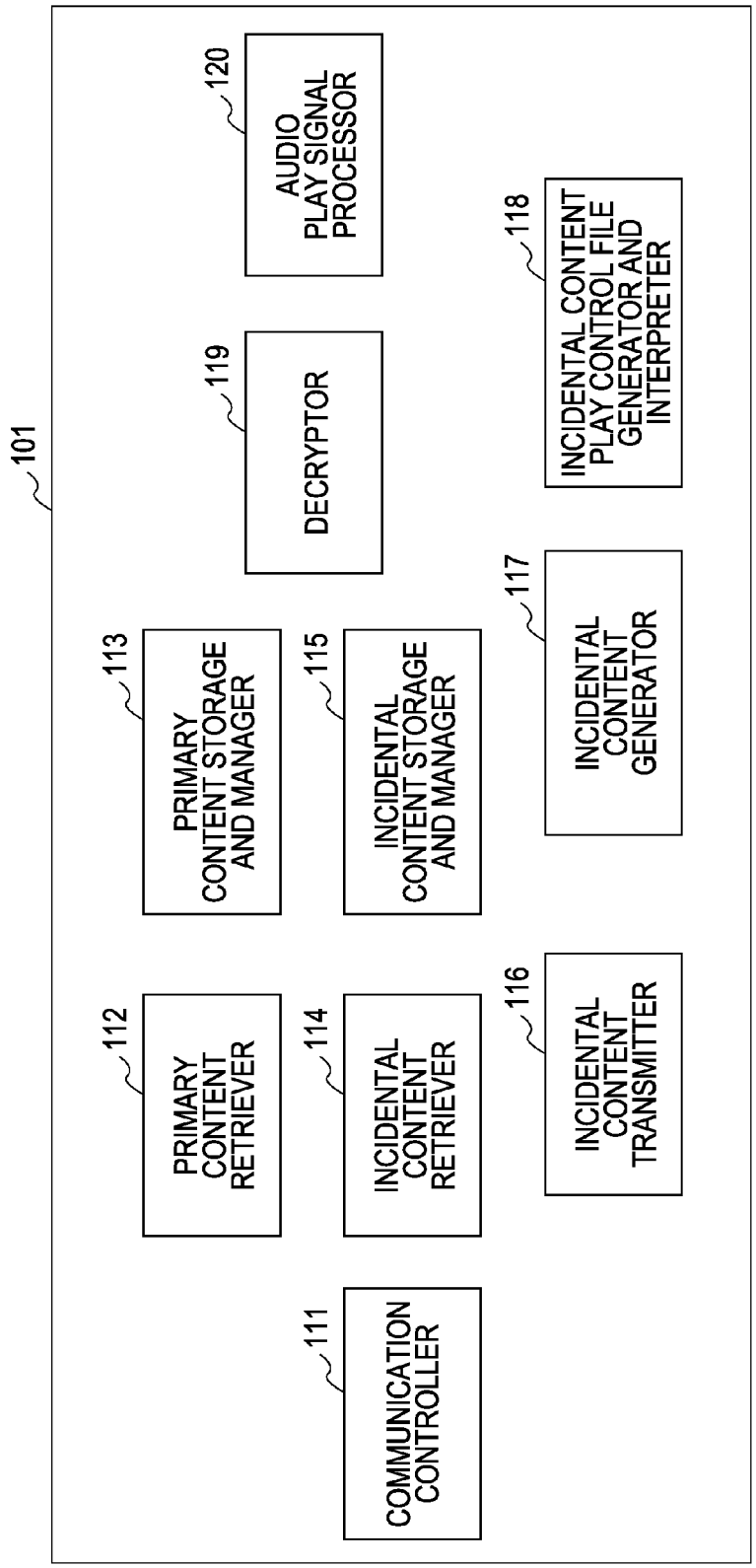
FIG. 11 is a functional block diagram of a program as a content editing and management tool of the music editing and sharing application in accordance with one embodiment of the present invention.

FIG. 11 is a functional block diagram diagrammatically illustrating a program structure of the content management and editing tool 101. As shown in FIG. 11, the content management and editing tool 101 includes a communication controller 111, a primary content retriever 112, a primary content storage and manager 113, an incidental content retriever 114, an incidental content storage and manager 115, an incidental content transmitter 116, an incidental content generator 117, a incidental content play control file generator and interpreter 118, a decryptor 119 and an audio play signal processor 120.

The communication controller 111 includes a program for communicating with one of the primary content server 1 and the communication server 3 in order to manage and edit content.

The primary content retriever 112 includes a program for retrieving primary content by downloading the primary content. The primary content retriever 112 provides a user interface for downloading the primary content. Furthermore, the primary content retriever 112 controls the communication controller 111 to issue a download request command and to receive a packet of data of the primary content. The primary content retriever 112 then restores the data in a data format as the primary content.

The primary content storage and manager 113 stores on the HDD 48 the primary content file retrieved by the primary content retriever 112 and manages the stored primary content file. For example, the primary content storage and manager 113 manages songs, for example, by sorting the songs according to artist name, album unit, genre, etc.

The incidental content retriever 114 includes a program for retrieving incidental content by downloading the incidental content.

The incidental content storage and manager 115 stores on the HDD 48 the incidental content play control file retrieved by the incidental content retriever 114 and manages the stored incidental content play control file.

The incidental content transmitter 116 under the control of the communication controller 111 causes the incidental content play control file to be transferred to the incidental content server 2 in an appropriate manner.

The incidental content generator 117 edits the editing material content of FIG. 3, i.e., produces the body of a song as incidental content. For example, the incidental content generator 117 provides a user interface for editing operation.

The incidental content play control file generator and interpreter 118 generates the incidental content play control file that accounts for the song of the incidental content generated by the incidental content generator 117. When the incidental content is played, the incidental content play control file generator and interpreter 118 interprets the incidental content play control file of FIG. 4 and determines a play sequence based on the editing material content.

In accordance with one embodiment of the present invention, the primary content file is encrypted before being transmitted by the primary content server 1. The incidental content play control file is also encrypted before being transmitted from the incidental content server 2 to the user terminal 4 in the download operation. The incidental content data, when uploaded from the user terminal 4 to the incidental content server 2, may also be encrypted. The decryptor 119 decrypts the encrypted primary content file and encrypted incidental content play control file when the primary content file and the incidental content play control file need to be played or edited. The incidental content play control file is encrypted if necessary.

The audio play signal processor 120 performs a predetermined signal process on the digital audio data before being converted into an analog signal when the digital audio data is played. For example, if the primary content file has been compression encoded, a decoding process needs to be performed on the digital audio signal in order to obtain a digital audio signal in pulse-code modulation (PCM), for example. When the incidental content is played, the audio play signal processor 120 plays a data portion of the primary content file as editing material content in accordance with the play process sequence determined by the incidental content play control file generator and interpreter 118.

When the incidental content is played, the incidental content play control file generator and interpreter 118 accounts for the interpretation results of the play control information in an editing work screen as a graphic user interface (GUI) provided by the incidental content generator 117. More specifically, a play instruction indicated by the play control information is displayed on the editing work screen in a manner recognizable by the user. Upon viewing the instruction, the user can learn in detail how the incidental content has been produced. This means that the user can recognize accurate information as to how the creator has produced the incidental content. For example, the user may wish to know how an audio digital signal of a song as content has been produced. The user may have guessed before how the content has been produced, by simply listening to the song and getting the acoustic impression of the song. The user terminal 4 of one embodiment of the present invention allows the user to learn more in detail and specifically how the incidental content has been produced. With the incidental content shared among users, the users using the music delivery and sharing system of the embodiment of the present invention are expected to improve substantially technique and knowledge related to music production. The music delivery and sharing system provides a high degree of entertainment and usefulness to users who are interested in music production.

The structure of the incidental content play control file is described below with reference to FIG. 12.

Figure 12:
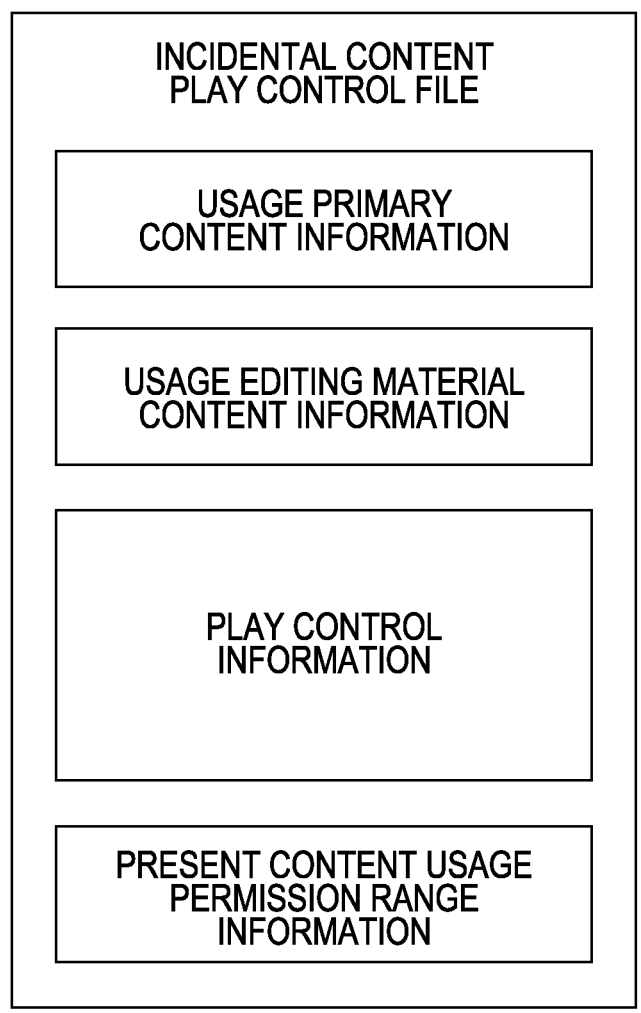
FIG. 12 diagrammatically illustrates a structure of an incidental content play control file in accordance with one embodiment of the present invention.

As shown in FIG. 12, the incidental content play control file contains, at least, usage primary content information, usage editing material content information, play control information and present content usage permission range information. The incidental content play control file contains these pieces of information in a predetermined structure. The play control information is information body (main information) of the incidental content play control file. The other information (the usage primary content information, the usage editing material content information and the present content usage permission range information) forms metadata.

The usage primary content information indicates the primary content required to play the song as the incidental content corresponding to the incidental content play control file (usage primary content). In other words, the usage primary content information indicates the primary content used to produce present incidental content. As shown in FIG. 5A, information indicating the primary content forming the incidental content newly produced in the editing process is the usage primary content information. As shown in FIG. 5A, the primary content A and B is illustrated as the usage primary content information. As shown in FIG. 5B, the primary content A, B and C is illustrated as the usage primary content information. As shown in FIG. 5C, the primary content C, D, E and F is illustrated as the usage primary content information.

Primary content may be deleted from the editing material content that has been edited to produce the incidental content. With reference to FIG. 5B, in the new incidental content as a song that has been obtained by editing the editing material contents A and B, the primary content A and C may be used as sound sources while the primary content D may not be used. In such a case, the audio data of the primary content used to play the incidental content is only the primary content A and C and the primary content D is not required.

In one display mode of the usage primary content information, only the primary content used to play the incidental content is displayed. More specifically, only the primary content A and C is displayed while the primary content D is not displayed.

In another display mode of the usage primary content information, all three pieces of the primary content A, C and D are displayed. Although the primary content D is actually not used, the incidental content is considerably affected in the course of production by the primary content D. The primary content D is thus considered to be actually used. All primary content, if used at least once by a generation in which present incidental content is produced, is contained in the usage primary content information.

The usage primary content information contains metadata related to the primary content listed therein.

The usage editing material content information indicates editing material content directly used to produce the incidental content corresponding to the present incidental content play control file (usage editing material content). The usage editing material content information of the edited incidental content shown in FIG. 5A is information indicating actual primary content files as the editing material content A and B. The usage editing material content information of the edited incidental content shown in FIG. 5B is information indicating incidental content (incidental content play control files) as a primary content file as the editing material content A and incidental content (incidental content play control file) as the editing material content C.

The usage editing material content information includes information related to each editing material content.

The play control information contains descriptions of a process sequence for playing a song as present incidental content. The play control information contains a description indicating primary content as real audio data to be played, a description indicating a data portion to be used to play incidental content from the audio data as the primary content and a description indicating time for playing the data portion. The play control information also contains descriptions for performing special effects, such as fade-in, fade-out, overlap, equalizing (sound quality adjustment), play speed magnification, reverberation, delay, etc.

The present content usage permission range information indicates information regarding a usage permission range set in the current incidental content. The resent content usage permission range information has a structure of usage content described with reference to FIG. 13.

FIG. 13 illustrates the structure of each of the usage primary content information and the usage editing material content information.

As shown in FIG. 13, the usage primary content information and the usage editing material content information are generally constructed by concatenating pieces of unit file information. Each unit file information corresponds to usage editing material content. For convenience of explanation, each of the usage primary content information and the usage editing material content information is simply referred to as "usage content" if there is no need to discriminate between the usage primary content information and the usage editing material content information.

The unit file information includes information items for file ID, artist name, song name, and content usage permission range information.

The file ID is a identifier unique to a content file of the usage content. More specifically, the file ID is the one for a primary content file of the usage content or the one for an incidental content play control file of the usage content. The primary content server 1 attaches the file ID to the usage primary content file and the incidental content server 2 attaches the file ID to the incidental content play control file.

The artist name as an information item indicates the name of a performer who has played the usage content or the name of a creator who has created the usage content.

The song name indicates the name of a song of the corresponding usage content.

Usage items 1-n list predetermined usage data related to each editing. A variety of usage data assigned to the usage items is contemplated. For example, the following data may be listed:

Data as to whether secondary use of the present content is permitted;

Data related to the use of another content as an editing material created by an artist different from the artist of the present content;

Data related to the use of another content as an editing material belonging to an album different from the album of the present content;

Data related to use of special effects;

Data related use of a particular plug-in module;

Editing material extracted from the entire song;

Permission content related to an audio data portion that is extracted from the entire song as an editing material;

Number of generations (for example, if the use of a primary content is permitted down to a grandchild's generation, incidental content of a child using the primary content and incidental content of a grandchild using the primary content can be produced, but the incidental content of the grandchild cannot be edited using the corresponding usage content); and Data related to the number of and type of pieces of content permitted to be used in a secondary usage in combination with the present content.

Information related to the usage permission such as "permitted/unpermitted" is set at each usage item. The permission content described at the usage items is summed up so that the usage permission range of the corresponding usage content is displayed.

FIG. 14 illustrates the play control information of the incidental content play control file.

As shown in FIG. 14, a description delimited by brackets (symbols "[" and "]") indicates a single play control description of one piece of usage content.

The play control description of the usage control unit of FIG. 14 is described below.

The play control description of the usage content unit appearing at the head of the data of FIG. 14 is:

```
[
file_id=AAAAAA;
time=00:00-00:10;
position=vv-zz
]
```

This description means that the usage content is specified by a file ID=AAAAAA. Play time of the present incidental content using the usage content is 00:00 (starting point) to 00:10 (play time of 10 seconds). During the play time, a data segment of the usage content ranges from address vv to address zz.

The play control description of the subsequent usage content is:

```
[
file_id=AAAAAA;
time=00:10-00:15;
position=ss-tt
]
```

This description means that the usage content is specified by a file ID=AAAAAA. Play time of the present incidental content using the usage content is 00:10 to 00:15. During the play time, a data segment of the usage content ranges from address ss to address tt.

The play control description of the subsequent usage content is:

```
[
file_id=BBBBBB;
time=00:15-00:20;
position=pp-uu
]
```

This description means that the usage content is specified by a file ID=BBBBBB. Play time of the present incidental content using the usage content is 00:15 to 00:20. During the play time, a data segment of the usage content ranges from address pp to address uu.

In this way, the audio play signal processor 120 in the music editing and sharing application 100 interprets successively the play control descriptions delimited by the brackets ([ and ]), and performs play control process in response to interpretation results. The incidental content is thus output as an audio signal.

The structure of the primary content file is described below.

Figure 15:
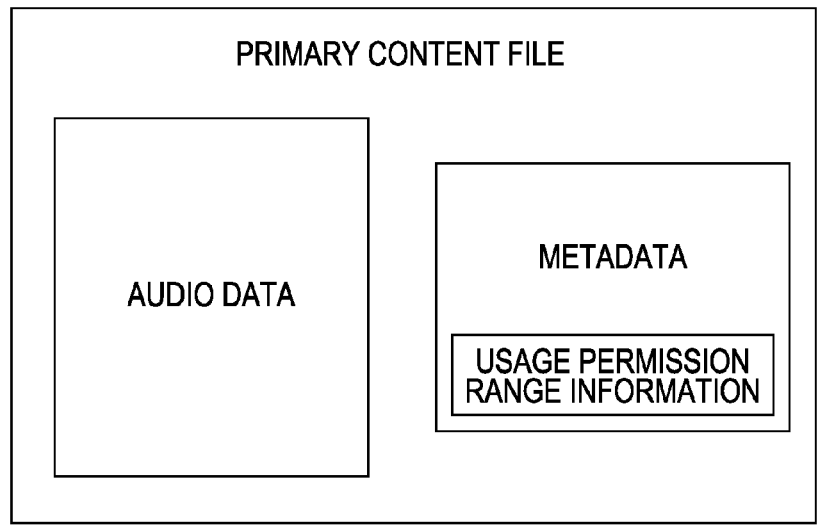
FIG. 15 diagrammatically illustrates a structure of a primary content file in accordance with one embodiment of the present invention.

As shown in FIG. 15, the primary content file includes the audio data in the predetermined format having a song as primary content and a variety of pieces of metadata related to the primary content. Compression encoded audio data is acceptable. By compression encoding the audio data, data size is reduced. The compression encoded audio data saves the memory capacity for the primary content in the primary content server 1 and is advantageous in transmission over the network.

The metadata forming the metadata group includes the usage permission range information of FIG. 13 in addition to information, incidental to the audio data, including the song title, artist, title of the album to which the primary content belongs, genre, data format and data size.

An incidental use of the primary content of one embodiment of the present invention is based on a permission of a copyright holder. The usage permission needs to be agreed with the copyright holder of the primary content (such as the artist). The range and content permitted by the copyright holder naturally vary depending on how copyright holder thinks of music. To respect the thinking of the copyright holder, the usage permission range information setting the usage permission range of the primary content is also contained in the metadata. In this way, the interests of the copyright holder are respected. It is an idea that a uniform usage permission range is applied to the primary content. In accordance with one embodiment of the present invention, usage permission range may be set to be different from primary content to primary content to account for the interests of the copyright holder. The music delivery and sharing system can thus be more smoothly operated.

The usage items of the present content usage permission range information in the metadata of the primary content is not limited to that of the incidental content of FIG. 13. It is sufficient if usage items required for the primary content are set.

Figure 16:
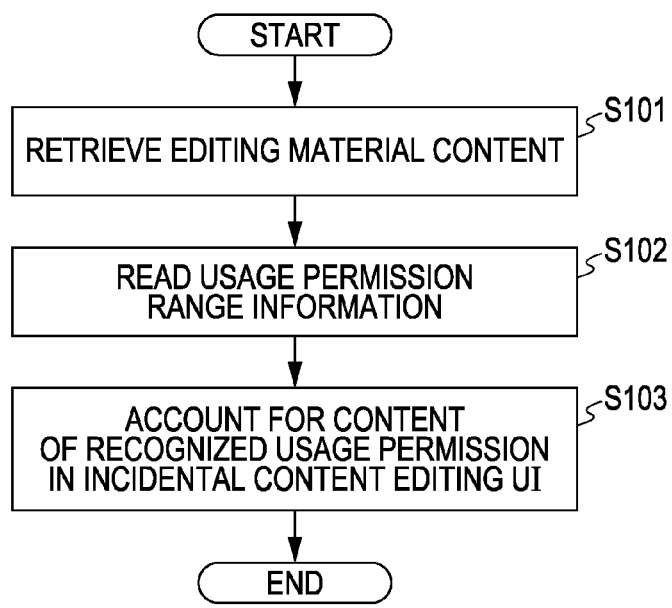
FIG. 16 is a flowchart of a process in which usage permission range setting of editing material content is accounted for in user interface (UI) in an incidental content editing process of the music editing and sharing application in accordance with one embodiment of the present invention.
Figure 17:
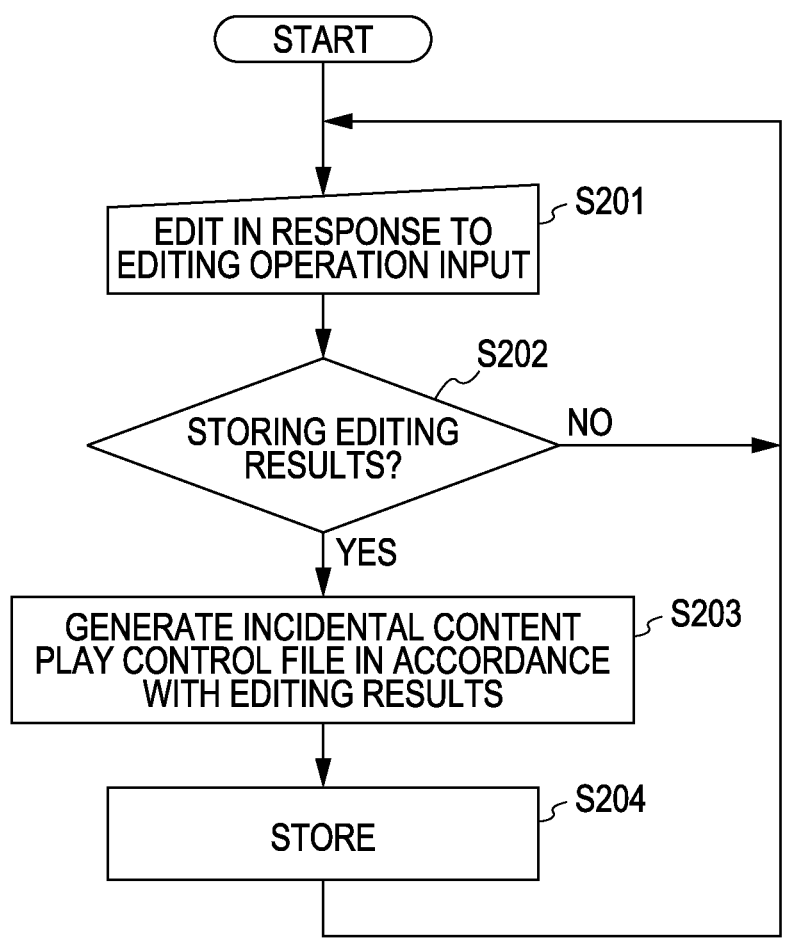
FIG. 17 is a flowchart illustrating production of the incidental content play control file in the incidental content editing process of the music editing and sharing application in accordance with one embodiment of the present invention.

The editing processes of the incidental content is described below with reference to flowcharts of FIGS. 16 and 17. The processes of FIGS. 16 and 17 are performed when the content management and editing tool 101 in the music editing and sharing application 100 is executed as a program.

The user of the user terminal 4 starts the content management and editing tool 101 in the music editing and sharing application 100 in order to edit the incidental content. The user searches the content to be used as a material for the production of the incidental content and registers (enters) the hit content as an editing material content. In response, the incidental content generator 117 in the content management and editing tool 101 performs the process of FIG. 16.

In step S101, the content management and editing tool 101 retrieves the data of the content registered as the editing material content. If the registered editing material content is the primary content, the data of a file as the primary content is retrieved. If the registered editing material content is the incidental content, the data of the incidental content play control file is retrieved.

In step S102, the content management and editing tool 101 reads the usage permission range information from the data retrieved in step S101. A variety of usage permissions set in the content registered as the editing material content is thus recognized as usage items 1-$n$ in the usage permission range information. In step S103, the content management and editing tool 101 sets the usage permission recognized in step S102 in a user interface (UI) for editing the incidental content. The process in step S103 disables the editing process beyond the usage permission range set in the editing material content. The incidental content generator 117 thus generates the incidental content.

FIG. 17 illustrates a generation process of the incidental content play control file as real data of the incidental content. The generation process is also performed when the content management and editing tool 101 is executed as a program.

In step S201, an editing process is performed in response to an editing operation input. For example, the incidental content generator 117 provides a graphic user interface (GUI) on which the user performs the editing process to produce the incidental content. Using the GUI, the user performs the editing operation to produce the incidental content. In response, the editing process is performed in step S201.

If it is determined in step S202 that an operation to store editing results has been performed, processing proceeds to step S203. In step S203, the incidental content play control file is produced based on the song as the incidental content obtained from the editing results. In step S204, the incidental content play control file is stored in an appropriate directory on the HDD 48. Subsequent to step S204, processing returns to step S201.

If the GUI screen is closed to produce the incidental content, the user may resume another process quitting the process of FIG. 17 (although such step is not shown).

The present content usage permission range information is produced before the production of the incidental content play control file. The present content usage permission range information may be automatically set on a per usage item basis in accordance with a predetermined rule within a range not beyond a minimum limit determined by summing present content usage permission range information of each primary content as the original editing material. Alternatively, the present content usage permission range information may be set in response to the user's setting. Even when the present content usage permission range information is set by the user, the setting falls within a range not beyond a minimum limit determined by summing present content usage permission range information of each primary content as the original editing material.

Figure 18:
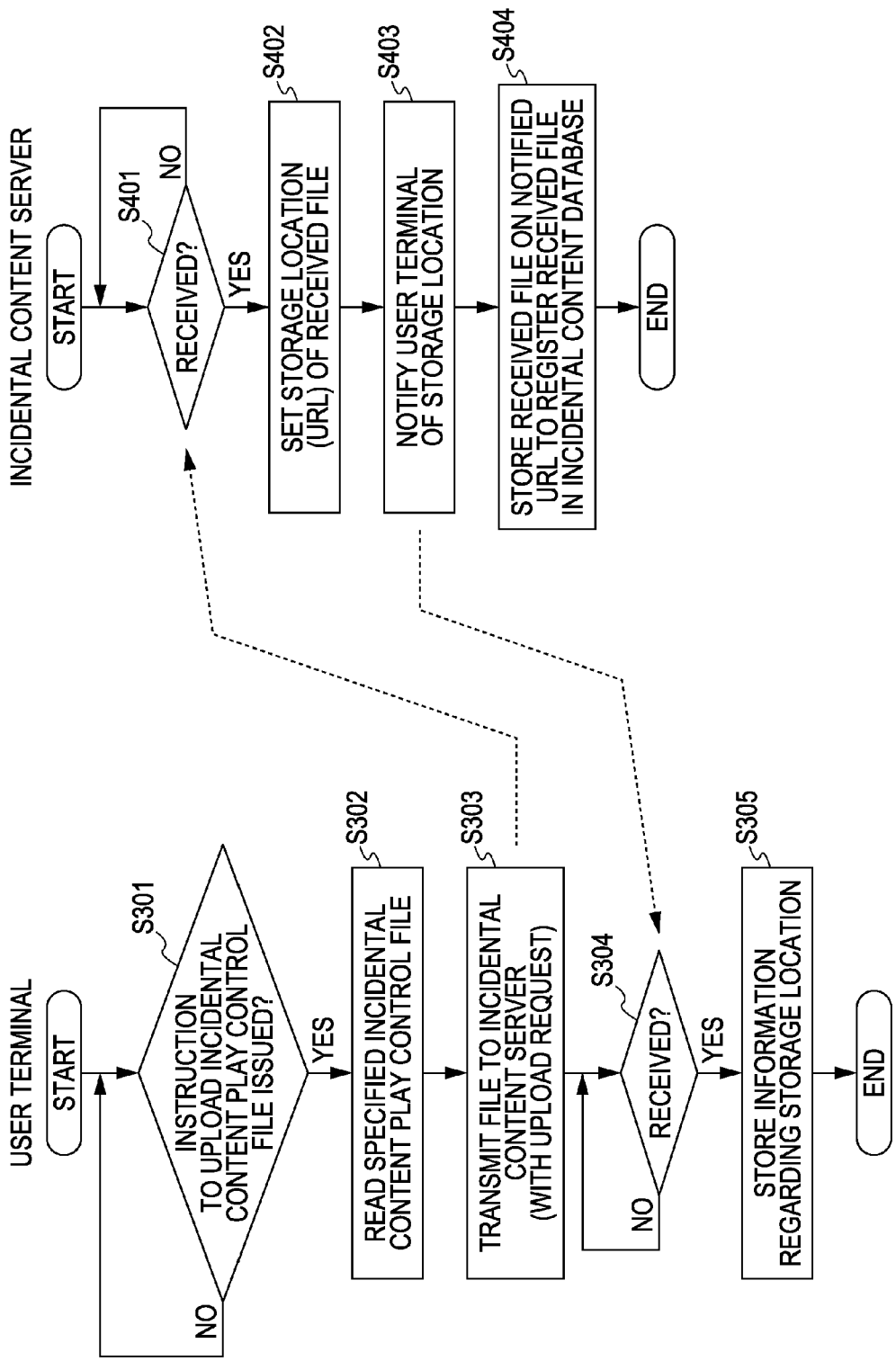
FIG. 18 is a flowchart illustrating an upload process of the incidental content performed by the user terminal and a corresponding process of the incidental content server in accordance with one embodiment of the present invention.

An upload process of the incidental content of the user terminal 4 is described below with reference to a flowchart of FIG. 18. A process performed by the incidental content server 2 in response to the upload process is also described with reference to the flowchart of FIG. 18. The process of the user terminal 4 is performed when the incidental content storage and manager 115 and the incidental content transmitter 116 are executed as programs. The process of the incidental content server 2 is performed in cooperation with the elements of FIG. 7. In practice, the process of the incidental content server 2 is performed when a computer system (CPU) forming the incidental content server 2 executes the program thereof.

In step S301, the user terminal 4 waits on standby for a command to upload the incidental content play control file. Pieces of incidental content (incidental content play control files) produced by the music editing and sharing application 100 are stored on the HDD 48. For example, the user operates the GUI provided by the content management and editing tool 101 to select at least one piece of incidental content to be uploaded, from among the incidental content and to upload at least one piece of incidental content. In response, the user terminal 4 generates a command instructing the upload of the incidental content corresponding to the incidental content selected on the GUI.

In step S302, the incidental content to be uploaded, namely, the incidental content play control file is read from a predetermined directory. In step S303, the user terminal 4 transmits the read incidental content play control file to the incidental content server 2 together with the upload request.

In step S401, the incidental content server 2 waits on standby for the upload request. In response to the receipt of the upload request, the incidental content server 2 performs step S402 and subsequent steps. To proceed to step S402 subsequent to the receipt of the upload request, an authentication process to authenticate the user is performed. Such an authentication process is omitted herein.

In step S402, the incidental content server 2 sets the storage location (URL) of the incidental content play control file received together with the upload request.

In step S403, the incidental content server 2 notifies the user terminal 4 having issued the upload request of the storage location of the uploaded incidental content (incidental content play control file).

The user terminal 4 having issued the upload request in step S303 waits on standby for the information relating to the storage location in step S304. Upon receiving the information regarding the storage location, the user terminal 4 stores the information regarding the storage location (URL) in an appropriate directory in step S305. The user can hereinafter call the information regarding the storage location by operating the content management and editing tool 101. If the storage location is a URL, a character string of URL may be displayed in response to a call request.

Figure 19:
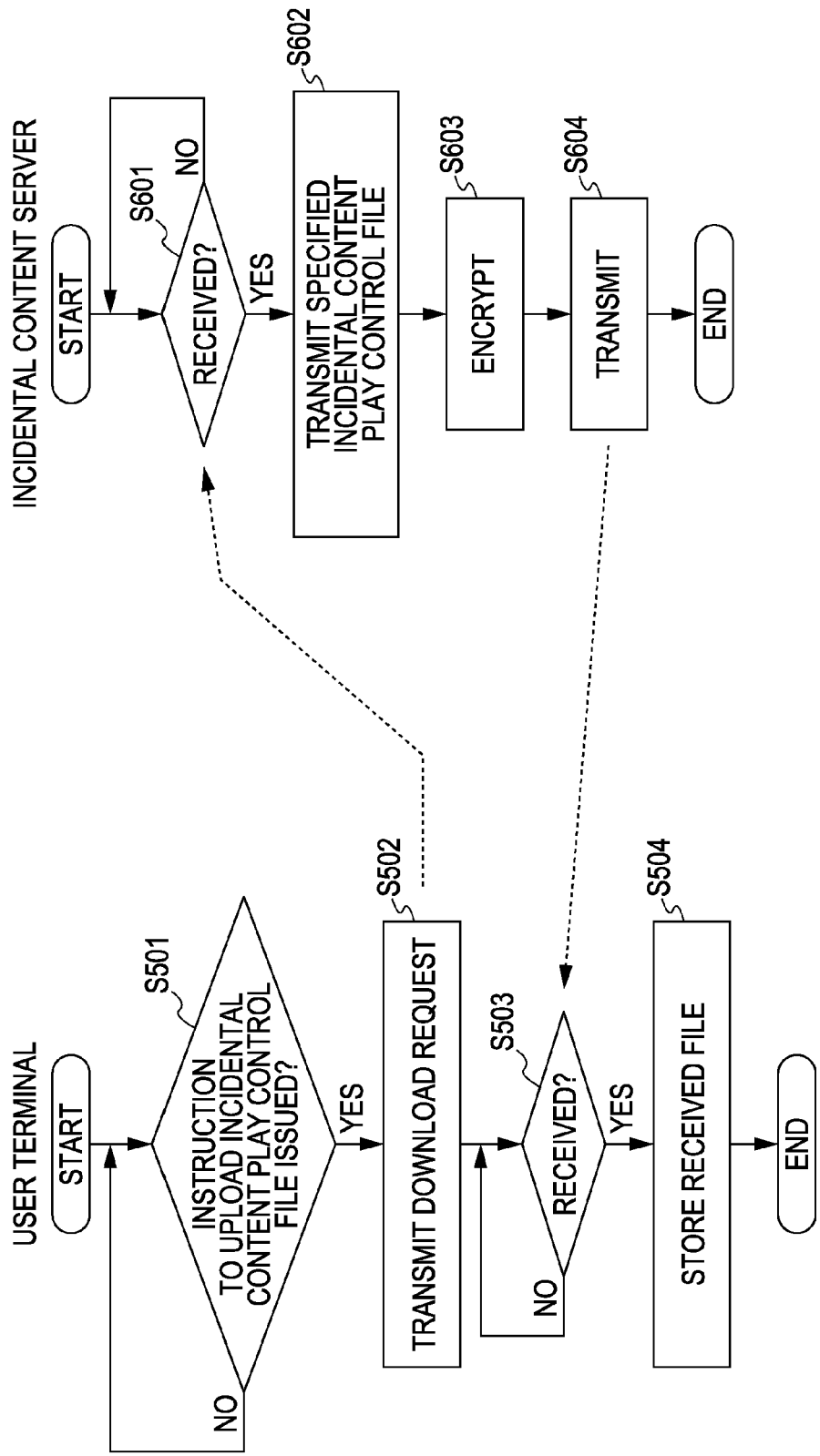
FIG. 19 is a flowchart illustrating a download process of the incidental content performed by the user terminal and a corresponding process of the incidental content server in accordance with one embodiment of the present invention.

FIG. 19 is a flowchart illustrating a download process of the incidental content performed by the user terminal 4 and a process performed by the incidental content server 2 in response to the download process. The process of the user terminal 4 is also performed when the incidental content storage and manager 115 and the incidental content transmitter 116 are executed as programs.

In step S501, the user terminal 4 waits on standby for a command instructing a download of the incidental content play control file. For example, the user operates the GUI provided by the content management and editing tool 101. The user thus accesses the incidental content server 2, selects at least one piece of incidental content to be downloaded, with a list of stored and managed incidental content displayed, and operates the GUI to download the selected incidental content. If an affirmative answer to the determination in step S501 results, processing proceeds to step S502.

In step S502, the user terminal 4 transmits a download request to the incidental content server 2 in response to the download command. The download request contains information specifying a directory (storage location) of the incidental content selected during the download command entering operation. The download request may be issued using a file ID of the incidental content play control file as real data of the incidental content rather than using the storage location.

In step S601, the incidental content server 2 waits on standby for the receipt of the download request. Upon the receipt of the download request, the incidental content server 2 performs the process in step S602. Before proceeding to step S602 subsequent to the receipt of the download request, an authentication process is performed. The authentication process is not discussed herein.

In step S602, the incidental content database 22a of the storage 22 is accessed to search the specified incidental content (incidental content play control file). The hit incidental content play control file is then transmitted to the requesting user terminal 4.

The user terminal 4 having transmitted the download request in step S502 waits on standby for the receipt of an incidental content play control file in response to the download request in step S503. Upon receipt of the incidental content play control file, the user terminal 4 stores and manages the received incidental content play control file in step S504.

Figure 20:
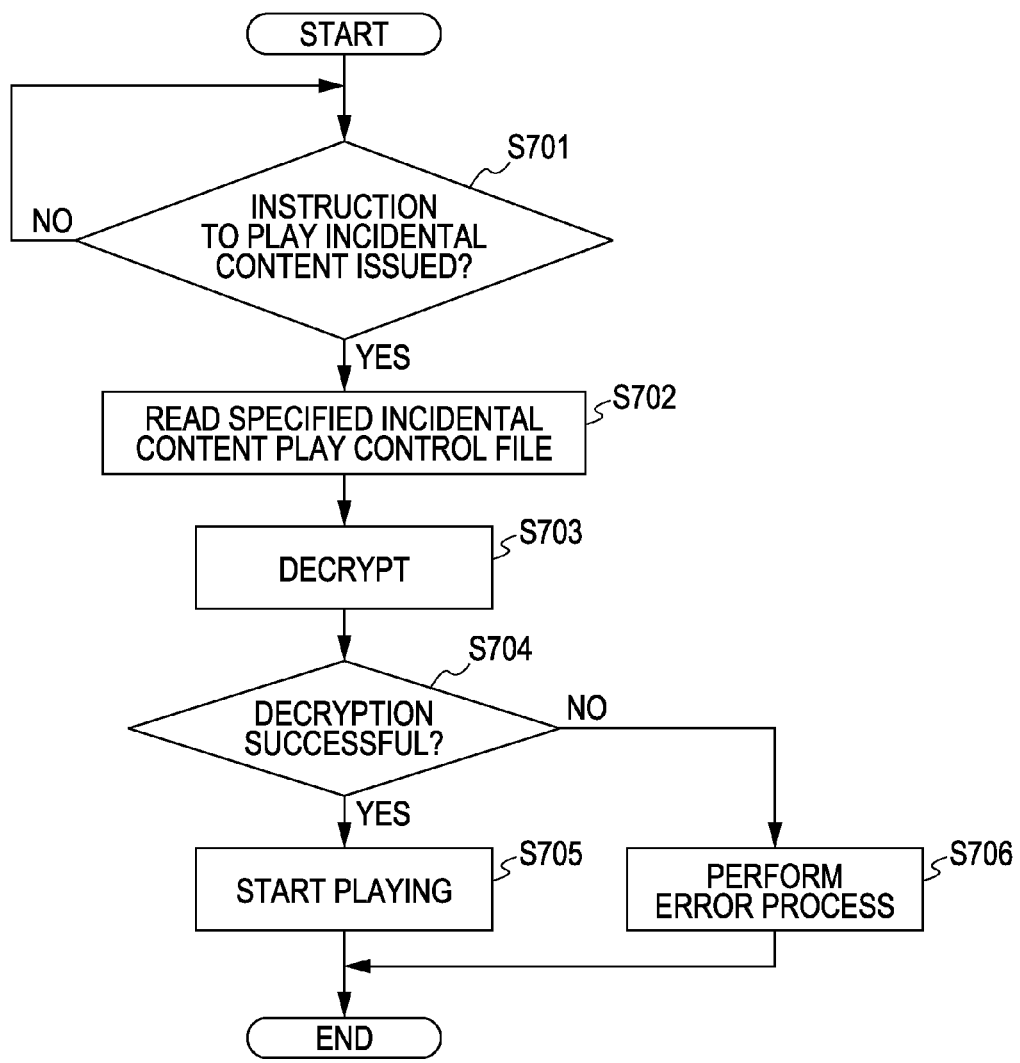
FIG. 20 is a flowchart illustrating a play process of the incidental content performed by the user terminal in accordance with one embodiment of the present invention.

FIG. 20 is a flowchart illustrating a playing process of the incidental content acquired in the download process (stored on the HDD 48). The process of the user terminal 4 is performed when the incidental content storage and manager 115, the decryptor 119 and the audio play signal processor 120 are executed as programs.

In step S701, the user terminal 4 waits on standby for a play start command to play the incidental content downloaded and stored on the HDD 48. The user now operates the GUI provided by the incidental content storage and manager 115, selects one piece of incidental content from the incidental content stored on the HDD 48 and gives an instruction to start playing the selected incidental content. Processing proceeds from step S701 to step S702.

In step S702, the incidental content play control file corresponding to the selected incidental content is read from the HDD 48.

It is assumed that the incidental content data acquired through downloading is stored in the encrypted state thereof on the HDD 48. In step S703, the read incidental content is decrypted.

If it is determined in step S704 whether the encryption process performed in step S703 has been successfully completed.

If the incidental content that is specified to be started in step S701 is the one legally downloaded from the incidental content server 2, the decryption process in step S703 is successfully completed and appropriate incidental content data is restored.

If the incidental content data is the one that is retrieved from the incidental content server 2 using means other than the downloading, the incidental content may or may not be encrypted using a different algorithm. In such a case, correct incidental content data cannot be restored through the decryption process in step S703 or no decryption process is required at all. More specifically, the decryption process in step S703 is aborted. The decryption process is also aborted in step S703 if no decryption process is required at all.

If it is determined in step S704 that an affirmative answer is obtained with successful decryption results, processing proceeds to step S705. The play control process of this incidental content then starts. If it is determined in step S704 that a non-affirmative answer is obtained with aborted decryption results, processing proceeds to step S706. An error process is thus executed. In the error process, the play control process is not started for the incidental content specified this time and the GUI thus notifies the user that the incidental content specified this time is unauthorized and cannot be played.

In accordance with one embodiment of the present invention, the user terminal 4 can play only the incidental content that has been retrieved from the incidental content server 2 in an authorized download process. The copyrights of the primary content and the incidental content are thus protected.

Another mechanism may be considered to allow only the incidental content downloaded from the incidental content server 2 in an authorized manner to be played. For example, when the user terminal 4 receives the incidental content in an authorized manner, the incidental content is decrypted. The incidental content with decryption results attached thereto is stored on the HDD 48. During playing, the attached information is referenced to determine whether to play or not. When the incidental content server 2 transmits the incidental content, a special code indicating that the incidental content is to be downloaded is embedded in the incidental content by the incidental content server 2. During playing, the user terminal 4 verifies the presence or absence of the code and the incidental content to determine whether to play the incidental content.

With the music delivery and sharing system of one embodiment of the present invention, an ordinary user can use original primary content in a secondary usage fashion, thereby producing incidental content. The usage permission range information is embedded in the primary content. The content management and editing tool 101 determines whether the incidental content can be produced or not based on the type and content of the editing process in accordance with the usage permission range information. The primary content cannot be used beyond the range set by the copyright holder.

However, depending on how the copyright holder feels, the copyright holder may not like actual incidental content that has been edited and produced within the predetermined user permission range.

It is not preferred to leave such incidental content (hereinafter referred to as "inappropriate incidental content") disclosed on the incidental content server 2. The inappropriate incidental content falls within the usage range limited by the usage permission range information. But if the copyright holder does not like the inappropriate incidental content, there is a possibility that the inappropriate incidental content violates the copyright.

One embodiment of the present invention relates to a mechanism that prevents only the inappropriate incidental content from being disclosed while protecting the copyright of the copyright holder of the primary content.

Figure 21:
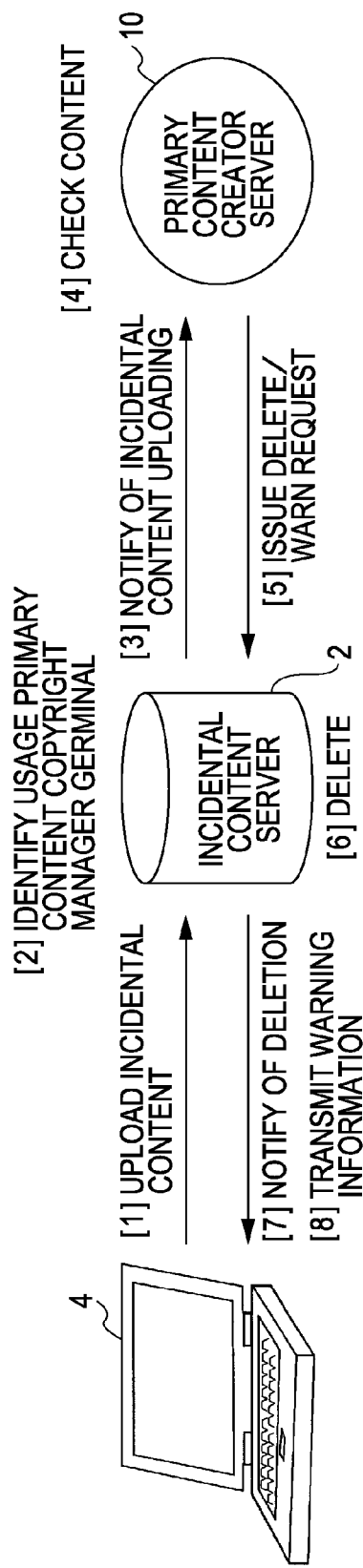
FIG. 21 illustrates communications performed with a copyright manager in the upload process of the incidental content in the system in accordance with one embodiment of the present invention.

FIG. 21 diagrammatically illustrates the mechanism not to disclose the inappropriate incidental content on the system. As shown in FIG. 21, each number delimited by brackets ("[" and "]") represents a respective procedure in the mechanism.

In a procedure 1, the user terminal 4 uploads incidental content to the incidental content server 2.

Upon receiving the uploaded incidental content (incidental content play control file), the incidental content server 2 registers (stores) the incidental content in the incidental content database 22a. In a procedure 2, the copyright manager of the usage primary content of the incidental content (i.e., a terminal of the copyright manager) is identified. The copyright manager refers to a person who manages the copyright of the usage primary content in the music delivery and sharing system of one embodiment of the present invention. The terminal of the copyright manager refers to a network terminal prepared by the copyright manager to exchange information of the music delivery and sharing system. The mechanism for the incidental content server 2 to identify the copyright holder will be described later.

In a procedure 3, the incidental content server 2 notifies a terminal 10 of the copyright manager identified in the procedure 2 that the incidental content based on the usage primary content as the primary content copyright managed by the copyright manager has been uploaded (i.e., disclosed). In the notification, information regarding the storage location of the incidental content is also transmitted.

When the copyright manager terminal 10 receives the notification in the procedure 3, the copyright manager can know the storage location of the incidental content and that the incidental content based on the usage primary content as the primary content copyright managed by the copyright manager has been disclosed. In a procedure 4, the copyright manager accesses the storage location notified to the incidental content server 2, listens to the incidental content by playing the incidental content, and verifies the incidental content as a song.

If the copyright manager likes the incidental content, no particular action is required. If the copyright manager does not like the incidental content (inappropriate incidental content), the copyright manager transmits requesting information from the copyright manager terminal 10 to the incidental content server 2 in a procedure 5. The requesting information requests the incidental content server 2 to delete the inappropriate incidental content determined to be disclosed. Alternatively, the copyright manager may transmit, to the incidental content server 2, information requesting the incidental content server 2 to warn against a creator of the inappropriate incidental content. The copyright manager may appropriately determine whether to transmit delete request or warn request. Optionally, both delete request and warn request may be transmitted concurrently.

Upon receiving the delete request, the incidental content server 2 deletes the inappropriate incidental content from the incidental content database 22a in a procedure 6 in response to the delete request information. The incidental content server 2 transmits, to the user (user terminal 4) having uploaded the inappropriate incidental content, a notification in a procedure 7 that the inappropriate incidental content has been deleted from the incidental content server 2.

Upon receiving the warn request, the incidental content server 2 warns the user (user terminal 4) having uploaded the inappropriate incidental content in a procedure 8. More specifically, the incidental content server 2 transmits to the user terminal 4 information notifying of warning. In response to the notification, the music editing and sharing application 100 in the user terminal 4 displays an interface image notifying the user that the warning about the incidental content has been issued. The user views the warning display and takes a proper action. For example, the user modifies the incidental content to satisfy the copyright manager's intention and attempts to upload the modified incidental content. Alternatively, the user may delete the present inappropriate incidental content from the incidental content database 22a in the management function of the music editing and sharing application 100.

Figure 22:
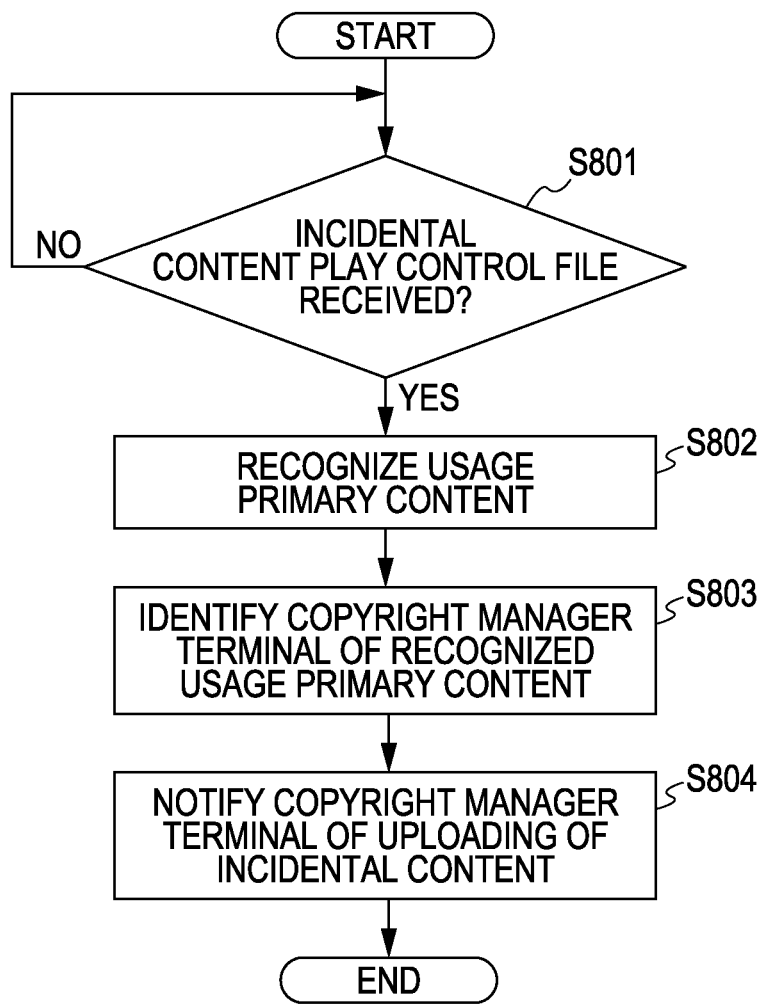
FIG. 22 is a flowchart illustrating an incidental content upload notification process performed from the incidental content server to the terminal of the copyright manager illustrated in FIG. 21.

FIG. 22 is a flowchart illustrating the procedures 2 and 3 illustrated in FIG. 21 and executed by the incidental content server 2. The process of FIG. 22 is mainly performed under the control of the program corresponding to the inappropriate incidental content processor 28 of FIG. 7.

As shown in FIG. 22, the incidental content server 2 waits on standby for receipt of an incidental content play control file. In response to the uploading of the incidental content from the user terminal 4, step S802 and subsequent steps are performed. In step S802, the incidental content play control file is received.

In step S802, the usage primary content information of the incidental content play control file received in step S801 is referenced. The usage primary content information used as the original editing material is recognized in the incidental content. To recognize and identify the usage primary content in step S802, the incidental content database 22a is structured so that a relationship between the incidental content and the original editing material is indicated. The incidental content database 22a is thus referenced.

In step S803, the copyright manager terminal 10 of the usage primary content recognized in step S802 is identified.

For example, the storage 22 stores table information (not shown in FIG. 7) listing a correspondence between the primary content stored and managed on the primary content server 1 and the copyright manager terminal 10. The table information is then referenced. Alternatively, the primary content database 12a in the incidental content server 2 may store the information regarding the copyright manager terminal 10 with each primary content associated therewith. The incidental content server 2 then accesses the primary content server 1, thereby inquiring of the copyright manager terminal 10 corresponding the usage primary content.

In step S803, the copyright manager terminal 10 of the usage primary content is identified. In step S804, the identified copyright manager terminal 10 is notified of the uploading of the incidental content. More specifically, the copyright manager terminal 10 is notified that the incidental content having the usage primary content as the primary content copyright managed by the copyright manager has been uploaded. As previously discussed, the information regarding the storage location of the uploaded incidental content is also transmitted in the notification of the uploading.

Figure 23:
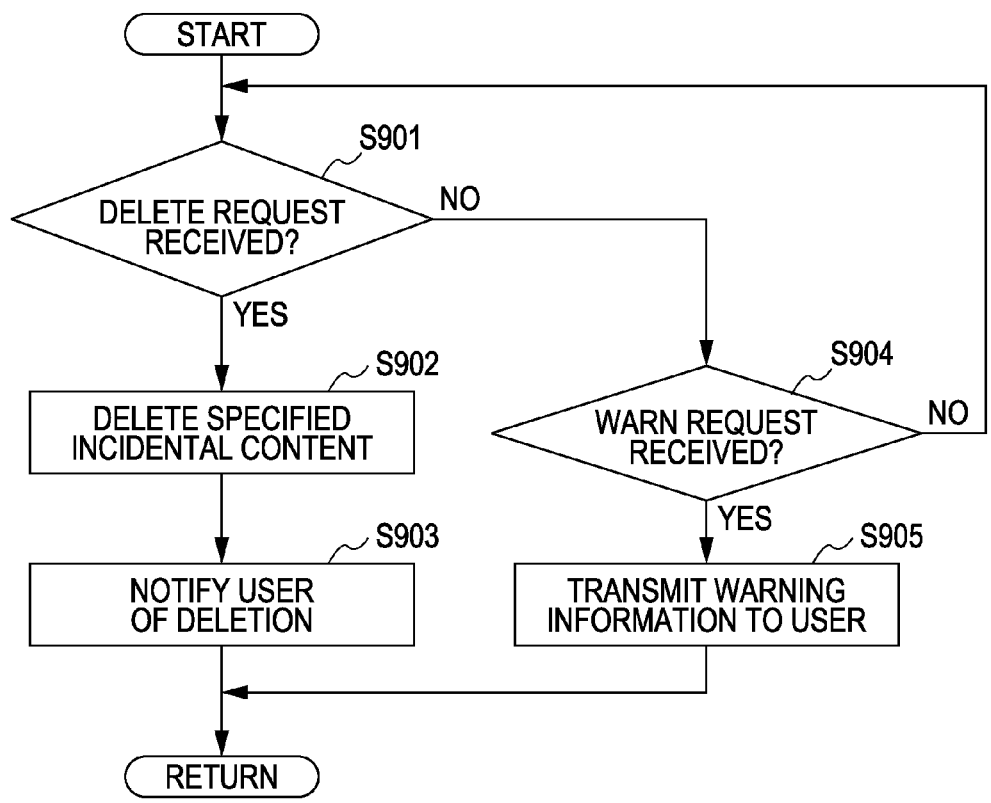
FIG. 23 is a flowchart illustrating operation of the incidental content server that responds to reception of delete request/warn request from the terminal of the copyright manager of FIG. 21.

FIG. 23 is a flowchart illustrating a process performed by the incidental content server 2 in response to the procedures 5-8 of FIG. 21. The process of FIG. 23 is performed in cooperation with the operations of the elements of FIG. 7 including the inappropriate incidental content processor 28.

In steps S901 and S904, the incidental content server 2 waits on standby for one of the delete request information and the warn request information from the copyright manager terminal 10. Upon receiving the delete request information, processing proceeds from step S901 to step S902.

In step S902, the incidental content server 2 deletes from the incidental content database 22a the incidental content specified by the delete request information. In step S903, the incidental content server 2 transmits the notification notifying of the deletion of the incidental content to the user terminal 4 of the user who has uploaded to the incidental content to be deleted. Upon receiving the notification, the music editing and sharing application 100 in the user terminal 4 displays an indication on the GUI screen notifying the user that the incidental content data has been deleted.

In response to the reception of the warn request information, processing proceeds from step S904 to step S905. In step S905, the incidental content server 2 transmits the warn information indicating that the copyright manager has issued a warning to the user terminal 4 of the user who has uploaded the incidental content having triggered the warning.

For example, the warn request information from the copyright manager terminal 10 is designed to allow information regarding a warning message to the user to be embedded. In step S905, the incidental content server 2 produces warning information by attaching thereto the information regarding the warning message contained the warn request information and then transmits the warning information. The music editing and sharing application 100 displays the warning message on the GUI screen thereof. In this way, the effect of warning becomes more effective to the user.

In the above discussion, the user terminal 4 is a personal computer. Alternatively, a mobile device such as a cell phone typically lower in throughput than the personal computer may be used for the user terminal 4. If a cell phone is used for the user terminal 4 in the system of one embodiment of the present invention, the user can use the user terminal 4 in a handier fashion.

The cell phone is typically lower in information processing performance than the personal computer. It is currently not practical to incorporate the function of producing the incidental content in the cell phones.

FIG. 24 illustrates a system as a modification of the above-referenced embodiment. Elements identical to those illustrated in FIG. 2 are designated with the same reference numerals and the discussion thereof is omitted herein. Numbers in brackets ("[" and "]") refer to procedures in the order of operation and the same numbers as those in FIG. 2 are used.

The system of FIG. 24 includes another content server 2-1 in addition to the primary content server 1, the incidental content server 2 and the communication server 3. The incidental content server 2 storages and manages the incidental content play control file as real data of the incidental content while the incidental content server 2-1 stores and manages an audio file as real audio data. The real audio data in the audio file managed by the incidental content server 2-1 is the one that has been compression encoded in a format that can be decoded by a user terminal 4C as a mobile device.

FIG. 24 illustrates the user terminal 4A and the user terminal 4C as the user terminals 4. The user terminal 4A stores the music editing and sharing application 100 installed thereon but the user terminal 4C does not store the music editing and sharing application 100. Alternatively, a simple application for system use is installed on the user terminal 4C. Depending on the simple application, the user terminal 4C can download and play the audio file as the primary content and the incidental content in the audio file format. The user terminal 4C can access the communication server 3 to receive the blog service and the SNS service. The user terminal 4C does not have an editing function for producing the incidental content.

The system operates as below. In procedures 1 and 2, in the same manner as described with reference to FIG. 2, the user terminal 4A downloads the primary content from the primary content server 1 and stores the downloaded primary content. The user terminal 4A produces the incidental content by performing the secondary editing process using the primary content. In the procedure 2 previously discussed, the incidental content play control file is produced as the incidental content. In the modification, the incidental content play control file is produced in the procedure 2 while the audio data file containing the song as the incidental content is also produced in a procedure 2-1.

In a procedure 3, the incidental content play control file is uploaded to the incidental content server 2 in the same way as described with reference to FIG. 2. Furthermore, in a procedure 3-1, the audio data file of the incidental content produced in the procedure 2-1 is also uploaded.

The notification of the user A of the user terminal 4A notifying the user C of the user terminal 4C that the incidental content has been uploaded is performed in the same way as in the procedures 6, 7 and 8 of FIG. 2. In the modification, however, the user terminal 4C is notified of the storage location of the incidental content in the incidental content server 2-1.

To download the incidental content, the user terminal 4C accesses the incidental content server 2-1 rather than the incidental content server 2 in a procedure 9-1. In a procedure 10-1, the downloaded incidental content is played. In this case, the primary content is not played in sequence in accordance with the incidental content play control file but the audio data of the incidental content is decoded and the resulting audio signal is played.

The present invention is not limited to the above-described embodiments.

For example, the primary content contains the digital audio data as the body thereof. Alternatively, the primary content may have the same data format as the incidental content. More specifically, a creator may produce source sounds as several pieces of digital audio data, performs the editing process on the source sounds handling the source sounds as the editing material contents, and produces a play control file equivalent to an incidental content play control file. The creator then handles a package of the digital audio data as a primary content.

Data for playing the primary content is the data of the play control file.

No specific GUI screen is presented as the music editing and sharing application 100 in the above discussion. A variety of GUI modes may be used for the music editing and sharing application 100.

The primary content server 1, the incidental content server 2, the communication server 3 and the user terminal 4 of FIGS. 6-9 are shown for exemplary purposes only and may be modified or changed as necessary. One of the three servers may be split into a plurality of servers. Conversely, at least two of the three servers may be combined into one.

The music editing and sharing application 100 is not limited to the one discussed with reference to FIGS. 10 and 11. A variety of modifications may be incorporated in the music editing and sharing application 100.

The incidental content play control files are shown in FIGS. 12, 13 and 14 for exemplary purposes only, and a variety of modifications and extensions may be incorporated in each of the incidental content play control files.

The processes, namely program codes, illustrated in the flowcharts of FIGS. 16-19, and FIGS. 22 and 23 are described for exemplary purposes only and a variety of modification may be incorporated.

The content played by the primary content data and the incidental content data are audio content such as songs. The content may be audio and video content as a moving image. In such a case, data used to play actual content as primary content is video signal data (and audio signal data played in synchronization with the corresponding video signal). The present invention is applicable to still image content such as a photograph or image.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
   a network interface to communicate via a network;
   at least one first storage;
   at least one processor; and
   at least one second storage having encoded thereon processor-executable instructions that, when executed by the at least one processor, cause the at least one processor to carry out a method comprising:
      receiving, via the network, first incidental content information relating to a first incidental content, the first incidental content having been produced at least in part by edit processing performed on a first primary content, the first incidental content information comprising play control information comprising an instruction to play at least a portion of the first primary content when the first incidental content is to be played;
      in response to receiving the first incidental content information,
         storing the first incidental content information in the at least one first storage,
         identifying, based at least in part on the play control information, the first primary content used in the edit processing to produce the first incidental content,
         identifying, for the first primary content, a network terminal of a copyright manager, the copyright manager being a manager of copyright in the first primary content and the network terminal being a different apparatus from the information processing apparatus, and
         notifying, via the network, the network terminal that the first incidental content information has been stored; and
      deleting the first incidental content information, newly stored by the at least one first storage, in response to a deletion request received from the network terminal over the network.

2. The information processing apparatus according to claim wherein the method further comprises:
   notifying another information processing apparatus having transmitted a newly stored incidental content information, via the network, of information indicating completion of deletion of the newly stored first incidental content information, in response to deletion of the newly stored incidental content.

3. The information processing apparatus according to claim 1, wherein the method further comprises:
   transmitting to another information processing apparatus having transmitted a newly stored incidental content information, via the network, information indicating predetermined information for warning, in response to reception of warn request information from the network terminal via the network.

4. A method for use with an information processing apparatus including at least one storage, the method comprising:
   receiving, via the network, first incidental content information relating to a first incidental content, the first incidental content having been produced at least in part by edit processing performed on a first primary content, the first incidental content information comprising play control information comprising an instruction to play at least a portion of the first primary content when the first incidental content is to be played;
   storing the first incidental content information in the at least one first storage;
   following storing the first incidental content information in the at least one first storage,
      identifying, based at least in part on the play control information, the first primary content used in the edit processing to produce the first incidental content,
      identifying, for the first primary content, a network terminal of a copyright manager, the copyright manager being a manager of copyright in the first primary content and the network terminal being a different apparatus from the information processing apparatus, and
      notifying, via the network, the identified network terminal of the first incidental content information; and
   deleting the first incidental content information, newly stored by the at least one first storage, in response to a deletion request received from the network terminal via the network.

5. An information processing apparatus, comprising:
   a communication unit to communicate via a network;
   at least one storage;
   a terminal identifying unit to identify a network terminal of a copyright manager that is a manager of copyright in a first primary content, the first primary content having been used in edit processing in the production of first incidental content, the first incidental content being associated with play control information, the play control information for the first incidental content comprising an instruction to play at least a portion of the first primary content when the first incidental content is to be played, the terminal identifying unit identifying the network terminal of the copyright manager for the first primary content in response to receipt, over the network, by the communication unit of at least the play control information associated with the first incidental content, the terminal identifying unit identifying the network terminal of the copyright manager at least in part by identifying, from the play control information, the first primary content used in the edit processing in the production of the first incidental content, the network terminal of the copyright manager being a different apparatus from the information processing apparatus;
   a new upload notification unit to notify, via the network, the network terminal identified by the terminal identifying unit of the first incidental content; and
   a deletion unit to delete the play control information associated with the first incidental content in response to a deletion request received from the network terminal via the network.

6. An information processing apparatus comprising:
   at least one processor;
   a network interface to send and/or receive information via a network;
   at least one first storage; and
   at least one second storage having encoded thereon processor-executable instructions that, when executed by the at least one processor, cause the at least one processor to carry out a method comprising:
      in response to receiving, via the network interface, first incidental content information related to a first incidental content, the first incidental content information having been produced at least in part by edit processing performed on a first primary content, the first incidental content information comprising play control information comprising an instruction to play at least a portion of the first primary content when the first incidental content is to be played, identifying, based at least in part on the play control information, the first primary content used as original editing material in the edit processing to generate the first incidental content, identifying a network terminal of a copyright manager for the primary content, the network terminal of the copyright manager being a different apparatus from the information processing apparatus, and notifying, via the network, the network terminal of the first incidental content; and deleting the first incidental content information in response to a deletion request received from the network terminal via the network.

* * * * *